(12) United States Patent
Yamada et al.

(10) Patent No.: US 7,805,901 B2
(45) Date of Patent: Oct. 5, 2010

(54) CONSTRUCTION MATERIAL AND BUILDING

(75) Inventors: Muneto Yamada, Osaka (JP); Kazutaka Uekado, Hyogo (JP); Akira Nakano, Kyoto (JP)

(73) Assignee: Panasonic Corporation, Osaka (JP)

( * ) Notice: Subject to any disclaimer, the term of this patent is extended or adjusted under 35 U.S.C. 154(b) by 718 days.

(21) Appl. No.: 11/666,489

(22) PCT Filed: Oct. 24, 2005

(86) PCT No.: PCT/JP2005/019520

§ 371 (c)(1),
(2), (4) Date: Apr. 27, 2007

(87) PCT Pub. No.: WO2006/046520

PCT Pub. Date: May 4, 2006

(65) Prior Publication Data

US 2007/0257227 A1  Nov. 8, 2007

(30) Foreign Application Priority Data

Oct. 28, 2004  (JP) .............................. 2004-314824

(51) Int. Cl.
   *E04B 1/74* (2006.01)
(52) U.S. Cl. .................... 52/406.2; 52/406.1; 52/404.1; 52/406.3; 52/404.2
(58) Field of Classification Search ............... 52/406.2, 52/406.1, 404.1, 405.3, 406.3, 407.4, 404.2
See application file for complete search history.

(56) References Cited

U.S. PATENT DOCUMENTS

| | | | | |
|---|---|---|---|---|
| 5,875,599 | A * | 3/1999 | McGrath et al. | 52/586.2 |
| 5,950,395 | A * | 9/1999 | Takemasa et al. | 52/742.11 |
| 5,987,833 | A * | 11/1999 | Heffelfinger et al. | 52/406.2 |
| 6,645,598 | B2 * | 11/2003 | Alderman | 428/69 |
| 2006/0024469 | A1 | 2/2006 | Tenra et al. | |

FOREIGN PATENT DOCUMENTS

JP  7-48884  2/1995

(Continued)

OTHER PUBLICATIONS

Partial English translation of JP 2001-287291, which was cited in the IDS filed Apr. 27, 2007.

(Continued)

*Primary Examiner*—Richard E Chilcot, Jr.
*Assistant Examiner*—Mark R Wendell
(74) *Attorney, Agent, or Firm*—Wenderoth, Lind & Ponack, L.L.P.

(57) ABSTRACT

The present invention provides a building to be constructed without any troublesome work.

The building is a building comprising a construction material 12, which has a plane heat insulation material 14 in which a madreporic core material is enclosed in a vacuum and a plate structural face material 12a, and whose heat insulation material 14 and structural face material 12a are combined in a way that a plane surface of the heat insulation material 14 faces to one side of a plane surface of the structural face material 12a, and further comprising a wooden base 9b assembled on the construction material 12 and an external wall finishing material 3 fixed on the wooden base 9b.

6 Claims, 29 Drawing Sheets

FOREIGN PATENT DOCUMENTS

| | | |
|---|---|---|
| JP | 7-139690 | 5/1995 |
| JP | 8-303686 | 11/1996 |
| JP | 9-111903 | 4/1997 |
| JP | 10-109374 | 4/1998 |
| JP | 10-131314 | 5/1998 |
| JP | 10-196000 | 7/1998 |
| JP | 10-311104 | 11/1998 |
| JP | 11-22050 | 1/1999 |
| JP | 2000-248653 | 9/2000 |
| JP | 2001-248286 | 9/2001 |
| JP | 2001-280583 | 10/2001 |
| JP | 2001-287291 | 10/2001 |
| JP | 2002-65461 | 3/2002 |
| JP | 2003-278290 | 10/2003 |
| JP | 2004-197935 | 7/2004 |
| JP | 2004-204606 | 7/2004 |
| JP | 2004-250477 | 9/2004 |
| KR | 1989-0005357 | 5/1989 |
| KR | 1998-703202 | 10/1998 |
| WO | 96/30197 | 10/1996 |

OTHER PUBLICATIONS

Partial English translation of JP 08-303686, which was cited in the IDS filed Apr. 27, 2007.
Partial English translation of JP 2001-287291, which was cited in the IDS filed April 27, 2007.

* cited by examiner

CONSTRUCTION MATERIAL AND BUILDING

TECHNICAL FIELD

The present invention relates to a construction material and a building.

BACKGROUND ART

In recent years, it has been a critical issue to deal with saving energy in an area of buildings such as residential housing as well as those of home electric appliances and industrial devices from an aspect of environmental conservation. Therefore, an application of various heat insulation materials or various heat insulation construction methods has been suggested (for example, see Reference Patent 1).

FIG. 1 shows an outline cross section diagram of a conventional building 1 disclosed in the Reference Patent 1. As shown in FIG. 1, the conventional building 1 in the Reference Patent 1 maintains a heat insulating property by having rigid polyurethane foam 2 as a heat insulation material, of which heat conductivity is below 0.020 W/mK, in an internal part of an external wall finishing material and a roof material 4.

Since the rigid polyurethane foam 2 has an excellent heat insulating property, it can be available for construction in a thin form. Therefore, when it is used for construction, it does not require a long nail or a screw, and it is possible to use construction nails such as a 15 cm nail that are generally used.

FIG. 2 is a diagram to explain a conventional construction procedure for heat insulation. In the conventional construction procedure for heat insulation, as shown in a perspective cross section diagram for an external wall 1a of the conventional building 1 in FIG. 2, a wooden axis 7 is assembled on a base column 6 of a concrete foundation 5, a structural face material 8 is attached on the wooden axis 7, and then on top of that, a plural number of wooden bases 9a are aligned in parallel in a vertical direction. Additionally, the rigid polyurethane foam 2 is located between the wooden bases 9a, plywood 10 is affixed on the rigid polyurethane foam 2, a plural number of wooden bases 9b are aligned in parallel on the plywood 10 in a vertical direction, and an external wall finishing material 3 is fixed on the wooden base 9b.

Patent Reference 1: Japanese Laid-Open Patent 2003-278290

SUMMARY OF THE INVENTION

However, in the structure of the conventional building 1, it is troublesome to pursue the construction since it requires a process to cut the rigid polyurethane foam 2 and insert it between each of the plural number of the wooden bases 9a.

Along with consideration of the above problem, the present invention aims at providing a construction material for making it possible to construct a building without any troublesome work, and also providing a building that can be constructed without any troublesome work.

In order to solve the above problem and achieve the above objective, the construction material of the present invention includes a plate form heat insulation material in which a core material is enclosed in a vacuum; and a plate form structural face material, in which the heat insulation material and the structural face material are combined into one in a way that one surface of the heat insulation material and one surface of the structural face material face each other. If a building is constructed with a construction material of the present invention, heat insulating construction can be completed just by attaching the construction material of the present invention on a part specified, and it reduces a process for cutting and filling a foamed heat insulation material and a process to assemble a wooden base on the foamed heat insulation material. Therefore, overall, it is possible to reduce a usage volume of the wooden base.

The construction material of the present invention may be a plural number of the heat insulation materials combined with the structural face material in a way that the plural number of the heat insulation materials are aligned two-dimensionally without overlapping. If a building is constructed with such a construction material, it does not deteriorate vacuum effects of other heat insulation material even though a nail or a screw is put on a core material of the heat insulation material during construction in a field so that it restrains deterioration of a heat insulating effect as an overall construction material.

The heat insulation material of the construction material of the present invention may be a material in which a plural number of the core materials are aligned two-dimensionally without overlapping, and each of the core materials is independently enveloped in a vacuum. If a building is constructed with such a construction material, it does not deteriorate vacuum effects of other core material even though a nail or a screw is put on a core material of any of the heat insulation material during construction in a field so that it restrains deterioration of a heat insulating effect as an overall heat insulation material. Also, compared with a construction material in which a plural number of the heat insulation materials having a single core material are attached on the structural face material in order to restrain heat insulating effect as an overall construction material from being deteriorated by putting a nail or a screw, the number of processes to attach the heat insulation material on the structural face material is reduced during manufacturing. Also, since the distance between the plural number of core materials and the positional relationships between the plural number of materials do not require adjustment, it is easier to manufacture the construction material.

The plural number of core materials may be different from each other in size or shape. Since the construction material can be bent flexibly at a section of the core material, the bending flexibility of the construction material can be adjusted by changing size or shape of the core material.

The heat insulation material has an exterior covering material to cover the core material from a top and a bottom of the core material, and to enclose the core material in a vacuum, and an upper part and a lower part of an area of the exterior covering material which does not sandwich the core materials are bonded up to an edge of the core material. As the upper part and the lower part in an area in which each core material of the exterior covering material is not sandwiched are connected to an edge of the core material, it is possible to reduce the width of a fin part (a non-core part), which does not have the core material in a peripheral part of the heat insulation material and width of the non-core part between adjacent core materials. Therefore, an area ratio of the core material part on the heat insulating surface gets bigger, which improves the heat insulating effect.

A first surface of the heat insulation material facing a first surface of the structural face material may not have an irregularity and be smooth and flat between a part where the exterior covering material faces the core material and a part where the exterior covering material does not face the core material. The other surface of the heat insulation material has an irregularity between a part where the exterior covering material faces the core material and a part where the exterior covering material does not face the core material. In this case, the surface that faces the structural face material in the heat insulation material is flat and smooth, it is easy to attach and fix the heat insulation material with a glue, etc. on the structural face material and its adhesion strength can be increased. Additionally, a surface, which is opposite to the surface facing the structural face material in the heat insulation material, has concavity and convexity as to whether a part that the exterior covering material is facing the core material or a part that the exterior covering material is not facing to the core material. Therefore, during construction in a field when a nail or a screw is put on the structural face material from the heat insulation material side, it is possible to pay attention not to put the nail or the screw on a part in which there is the core material based on the concavity and convexity.

The plural number of the heat insulation materials may be combined with the structural face material into one in a way that the plural number of the heat insulation materials are stacked.

Furthermore, it is preferable that the plural number of the heat insulation materials are stacked in a way that the core materials do not overlap with the core materials. In this structure, if the size and the number of the heat insulation material are adjusted, it is possible to place the core material on an entire surface of the construction material so that the heat insulating effect can be improved.

Moreover, in this case, in the heat insulation material located at a top and a bottom of the plural number of the heat insulation materials stacked, a surface opposite to a surface where the heat insulation materials face each other does not have an irregularity and is flat and smooth between a part where the exterior covering material faces the core material and a part where the exterior covering material does not face the core material. In this case, because the surface that faces the structural face material in a plural number of the heat insulation materials stacked is flat and smooth, it is easy to attach and fix the heat insulation materials with a glue, etc. on the structural face material and its adhesion strength can be increased. Also, because the surface at a non-structural face material side in a plural number of the heat insulation materials stacked is flat and smooth, it is easy to handle the construction material.

Additionally, in this case, in the plural number of the heat insulation materials stacked, a surface where the heat insulation materials face each other has an irregularity between a part where the exterior covering material faces the core material and a part where the exterior covering material does not face the core material. In this case, if the concavity and the convexity facing are engaged successfully, a ratio of the heat insulation material in a space in which the heat insulation material is located can be increased so that the heat insulating effect can be improved.

It is preferable that the heat insulation material has an exterior covering material to cover the core material from a top and a bottom of the core material and to enclose the core material in a vacuum, and the exterior covering material includes: a first laminate film that includes a metal vacuum evaporation layer located at one surface side of the core material; and a second laminate film that includes a metal foil layer located at other surface side of the core material. Because the heat capacity is different between the metal foil layer and the metal vacuum evaporation, it is possible to suppress heat leakage (heat transference from a high temperature surface to a low temperature surface in the heat insulation material) that might occur through a joining surface between these two pieces of laminate films used when the heat insulation material is applied.

It is preferable that the first laminate film includes a polyacrylic resin layer laid on a surface, which is farther from the core material, of the metal vacuum evaporation layer. Therefore, if the polyacrylic resin layer is located on the metal vacuum evaporation layer, its gas barrier property is improved more than expected from the gas barrier property in a case in which each layer is respectively used. Because, in a case of a single metal vacuum evaporation layer, it easily gets cracks if it is laminated or it is used in a part of construction material that causes flexion. However, those cracks occurs on the metal vacuum evaporation layer can be prevented by protecting the metal vacuum evaporation layer with the polyacrylic resin. Therefore, it is possible to maintain the heat insulating property of the vacuum insulation material for a long term by setting up this structure.

It is preferable that the heat insulation material has an exterior covering material to cover the core material from a top and a bottom of the core material and to enclose the core material in a vacuum. The exterior covering material includes: a first laminate film that includes a metal vacuum evaporation layer located at one surface side of the core material; and a second laminate film that includes a metal foil layer located at other surface side of the core material. The first laminate film includes a polyacrylic resin layer laid on a surface, which is farther from the core material, of the first metal vacuum evaporation layer, and the second laminate film includes a polyacrylic resin layer laid on a surface, which is farther from the core material, of the second metal vacuum evaporation layer. In this structure, because both sides of the exterior covering material are the metal vacuum evaporation layers that have a small heat capacity, it is possible to suppress heat leakage that occurs through the joining surface. Besides, the exterior covering material has a laminate film consisting of the metal vacuum evaporation layer containing a polyacrylic resin layer having a high gas barrier property. Therefore, it can maintain the heat insulating property of the heat insulation material for a long period of time.

It is preferable that the heat insulation material is included in a foamed heat insulation material and is combined with the structural face material into one via the foamed heat insulation material. In this case, since the heat insulation material is not exposed, it is possible to prevent a pouch of the heat insulation material from being broken because of a foreign article at a construction field or inferior handling. Additionally, the heat insulating property is further improved and the heat insulating property of the building can be more advanced. The foamed heat insulation material may be, for example, rigid polyurethane foam.

The heat insulation material and the structural face material may have a through-hole in a thickness direction, and the heat insulation material and the structural face material are combined into one in a way that each of the through-holes of the heat insulation material is overlapping with each of the through holes of the structural face material. If such a construction material is used, it is possible to install a facility that needs to be penetrated from an inside to an outside of the building such as a ventilation fan.

Furthermore, it is preferable that the construction material of the present invention includes a waterproof sheet laid on an external surface of the heat insulation material. With such a structure, it is possible to prevent outside moisture from going into the inside of the heat insulation material, which suppresses deterioration of the heat insulating property due to an increase in inner pressure of the core material.

Furthermore, it is preferable that the construction material of the present invention includes a moisture-proof and airtight sheet laid on an external surface of the structural face material. With such a structure, it is possible, especially in winter, to prevent air at high temperature, which contains moisture in the building, from causing dew condensation when it touches a cold wall located outside of the vacuum heat insulation material.

Also, a building of the present invention includes a construction material of the present invention; a wooden base assembled on the construction material; and an external wall finishing material fixed on the wooden base. Since the construction material of the present invention is used for the building of the present invention, heat insulation construction can be completed by attaching the construction material of the present invention on a designated location when the building of the present invention is constructed, which makes it possible to reduce a process to cut and insert a foamed heat insulating material and a process to assemble a wooden base on the foamed heat insulation material. Because of this, it is possible to reduce usage volume of the wooden bases.

It is preferable that the construction material is located in a way that the heat insulation material faces the wooden base. With this structure, it is possible to increase a heat insulating property of the building since a coverage ratio of the heat insulation material for the building becomes higher.

In the building of the present invention, the construction material is (1) a construction material in which a plural number of the heat insulation materials are combined with the structural face material into one in a way that the plural number of the heat insulation materials are aligned two-dimensionally without overlapping, or (2) a construction material whose heat insulation material is, in a way that a plural number of the core materials are aligned two-dimensionally without overlapping, a material in which each of the core materials is independently enclosed in a vacuum, and the wooden base is incorporated into the construction material with a nail or a screw. If the construction material like the above is used, there is an area in which there is no core material of the heat insulation material between the construction material and the wooden base, either a nail or a screw does not run through the core materials. Even if a nail or a screw runs through some of the core materials, a vacuum degree of other core materials is not deteriorated so that the heat insulating property as an overall construction material is secured.

Also, the building of the present invention includes a plural number of the construction materials of the present invention, in which each of the heat insulation materials included in the construction materials has a different thickness. By doing so, it is possible to optimize a coefficient of heat loss at each part of the building according to climate conditions in a region where the building is constructed or a usage purpose of each room in the building, etc.

In addition, the building of the present invention includes a plural number of the construction materials of the present invention, in which each of the heat insulation materials included in the construction materials has a different area ratio of the core material. By doing so, it is possible to optimize a heat insulating effect with the heat insulation according to climate conditions in a region where the building is constructed or a usage purpose of each room in the building, etc.

Furthermore, a building method of the present invention is a construction method for constructing a building using the construction material of the present invention. By doing so, at the time of construction, heat insulation construction can be completed by attaching the construction material of the present invention on a designated location, which makes it possible to reduce a process to cut and insert a foamed heat insulating material and a process to assemble a wooden base on the foamed heat insulation material. Because of this, it is possible to reduce usage volume of the wooden bases.

Moreover, a heat insulation material of the present invention is a sheet-type heat insulation material having a plural number of core materials enclosed in a vacuum, and is wound and retained in a roll. By doing so, even if the heat insulation material is cut into a certain desired size, it is possible not to affect breakage of the pouch (deterioration of a vacuum degree) from scission on a part other than the cut location, and to cut the heat insulation material with the least possible scrapped part.

In addition, a heat insulation material of the present invention is a plane heat insulation material whose madreporic core material is enclosed in a vacuum, and has an adhesive layer on a surface and a release paper on the adhesive layer. By doing so, just by peeling off the release paper, it is possible for a worker to easily put the heat insulation material in designated size on a desired part.

Furthermore, a heat insulation material of the present invention is a plane heat insulation material having a plural number of madreporic core materials that are enclosed in a vacuum, and is marked at specific intervals. By using the mark, it is easy to find out the size. Therefore, in a building construction site, a worker can easily cut out a heat insulation material in a size he desires. Also, even if the heat insulation material of the present invention is cut into a certain desired size, it does not affect breakage of the pouch (deterioration of a vacuum degree) from scission on a part other than the cut location.

The present invention can provide a construction material that makes it possible to construct a building without any troublesome work, and also providing a building that can be constructed without any troublesome work.

NUMERICAL REFERENCES

Figure 1:
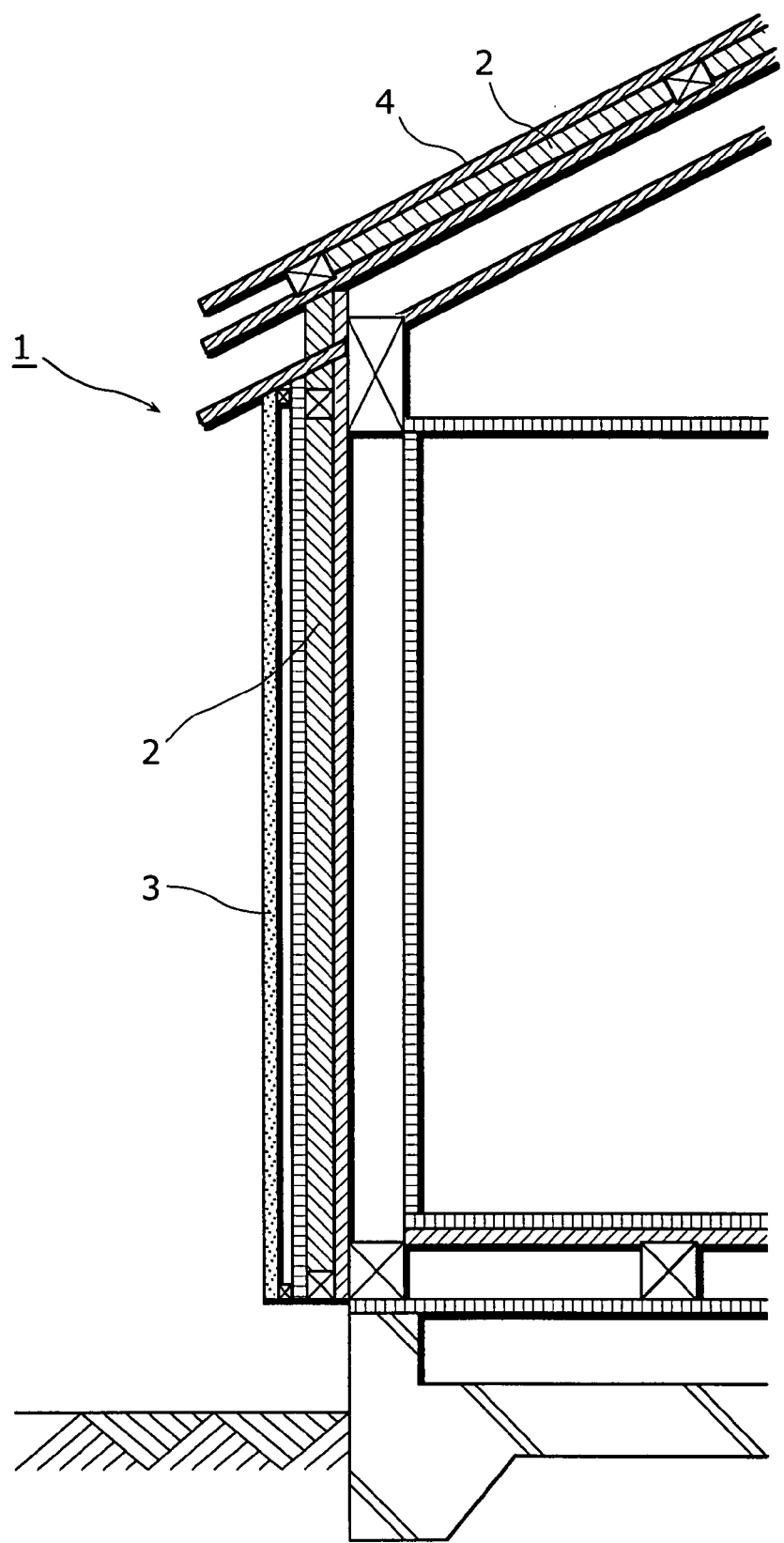
FIG. 1 is an overview cross section diagram of a conventional building.
Figure 2:
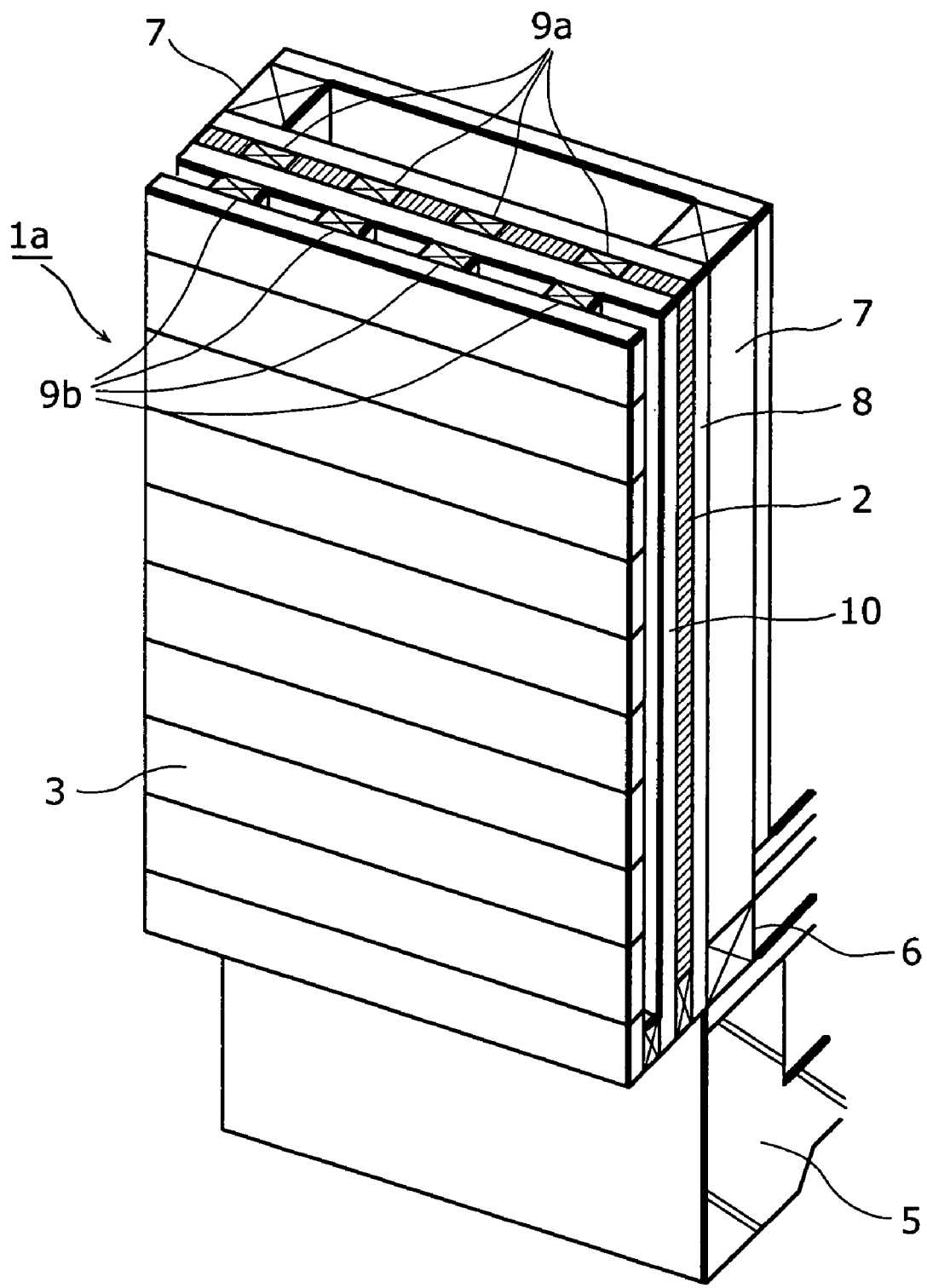
FIG. 2 is a perspective cross section diagram of the conventional building.

3 External wall finishing material
9b Wooden base
11 Building
12 Construction material
12a Structural face material
14, 14A, 14B, 14C Vacuum insulation material
15 Waterproof sheet
16 Moisture proof and airtight sheet
17 Core material
18 Exterior covering material
19 Nail
20, 20A, 20B, 20C Vacuum insulation material
23 Metal foil layer
24 Metal vacuum evaporation layer
25 Polyacrylic resin layer
27 Vacuum insulation material
28 Rigid polyurethane foam
29 Through-hole
30 Vacuum insulation material

DETAILED DESCRIPTION THE INVENTION

The following explains the best mode for carrying out the present invention with reference to drawings. The same numerical reference is provided to those having the same structure as ones explained in the background art and their detailed explanation is omitted. In the same way, in an embodiment that is mentioned subsequently among a plural number of embodiments, the same numerical reference is provided to those having the same structure as ones explained in a preceding embodiment and their detailed explanation is omitted. However, the present invention is not limited by embodiments described below.

First Embodiment

Figure 3:
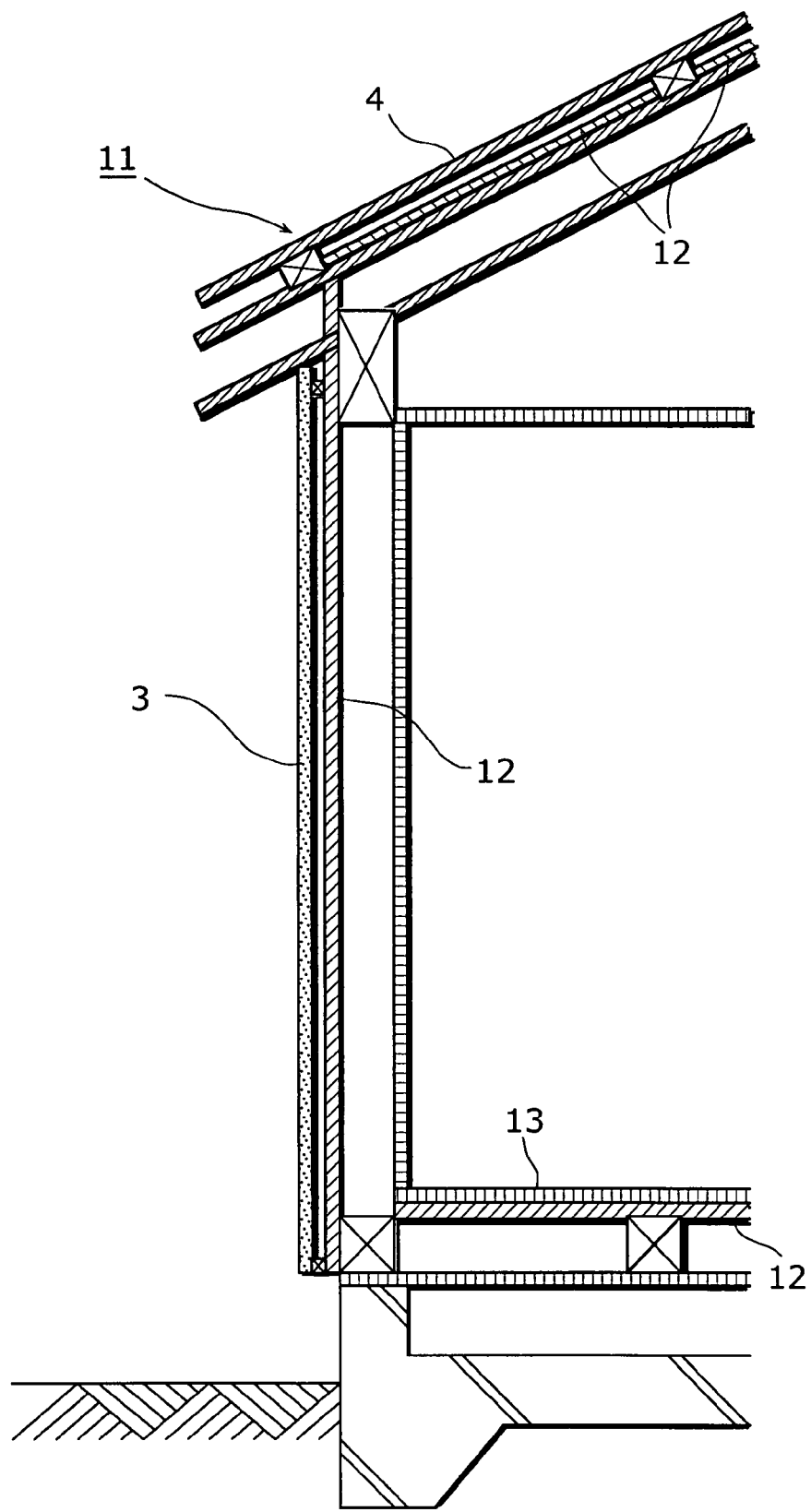
FIG. 3 is an overview cross section diagram of the building in a first embodiment.
Figure 4:
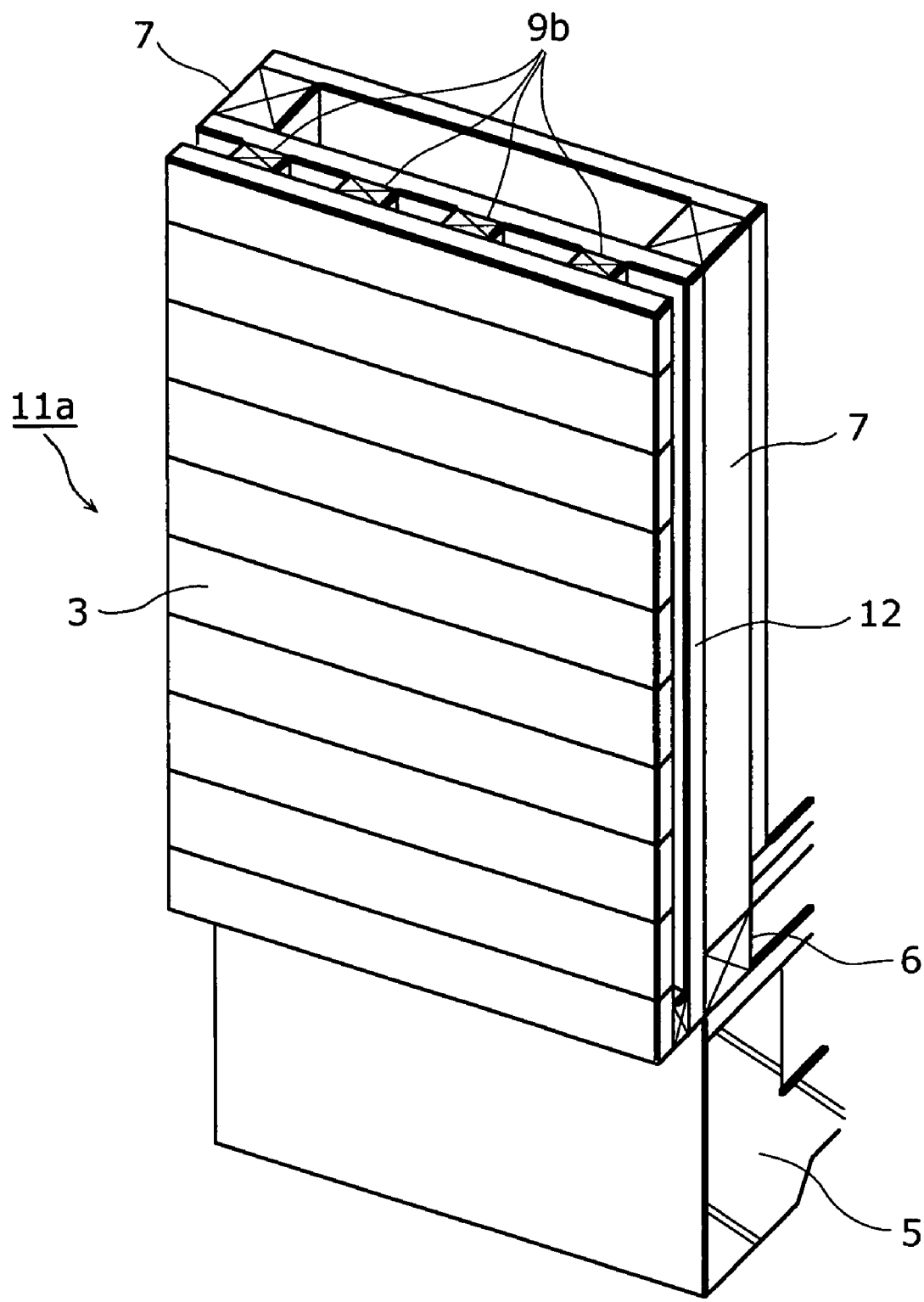
FIG. 4 is a perspective cross section diagram of an external wall in the first embodiment.
Figure 5:
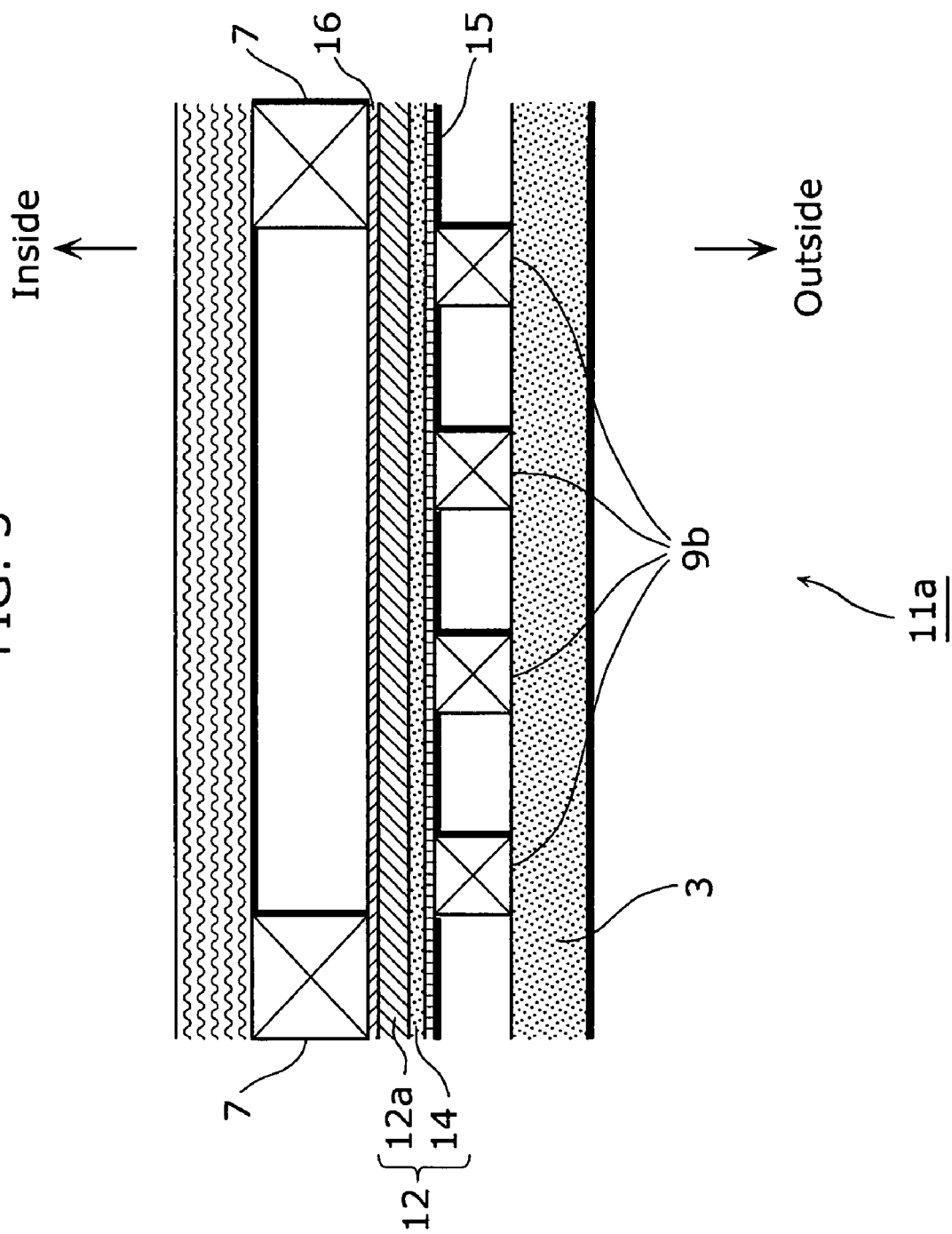
FIG. 5 is a cross section diagram of the external wall of the building in the first embodiment.
Figure 6:
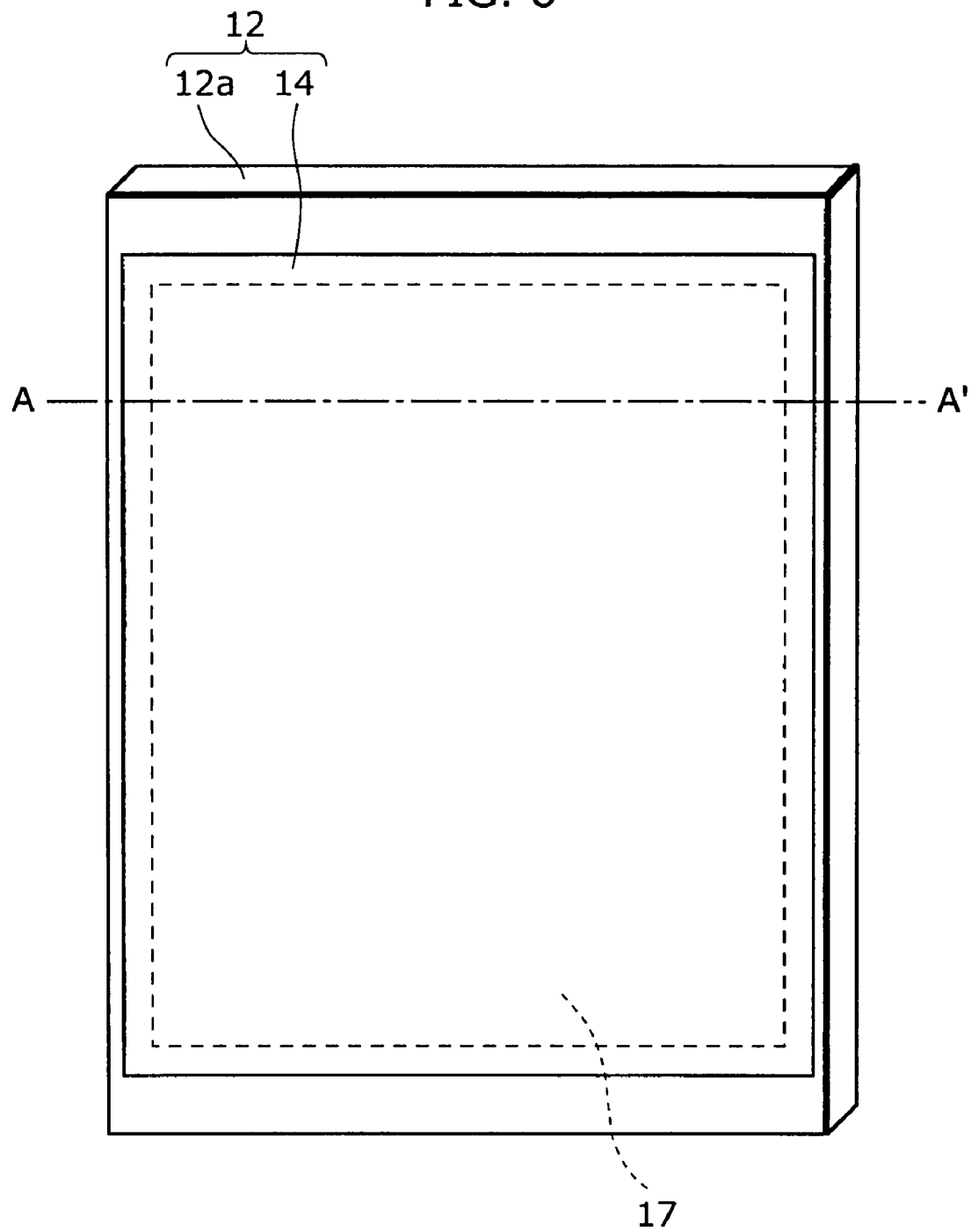
FIG. 6 is an external view diagram of a construction material being used for the building in the first embodiment.
Figure 7:
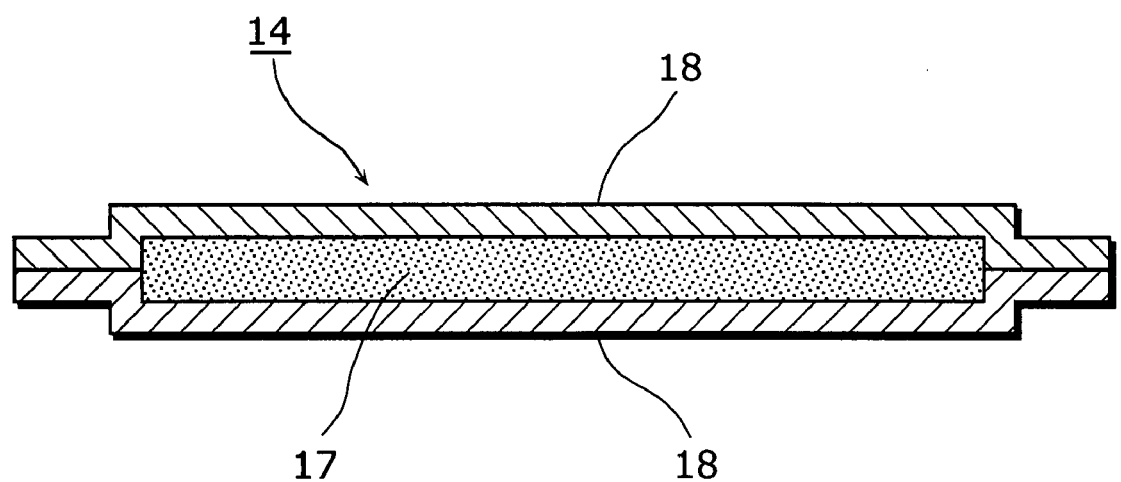
FIG. 7 is a cross section diagram of an A-A' line of a vacuum insulation material making up of the construction material in FIG. 6.

FIG. 3 is an overview cross section diagram of a building 11 in the first embodiment, FIG. 4 is a perspective cross section diagram of an external wall part 11a of the building 11, FIG. 5 is a cross section diagram of the external wall part 11a of the building 11, FIG. 6 is an external view diagram of a constructional material 12 being used for the building 11, FIG. 7 is a cross section diagram of a line A-A' of a vacuum insulation material 14 making up of the construction material 12 in FIG. 6.

As shown in FIG. 3, the building 11 in the first embodiment maintains a heat insulating property by having the construction material 12 in internal parts of an external wall finishing material 3 and a roof material 4, and in an external part of a floor finishing material 13.

In the construction procedure for heat insulation in the first embodiment, as shown in FIG. 4, the wooden axis 7 is assembled on a base column 6 on the top of a concrete foundation 5, the construction material 12 is attached on the wooden axis (beam) 7 on the top of it, a plural number of the wooden bases 9b are aligned in parallel in a vertical direction, and then the external wall finishing material 3 is fixed on the wooden bases 9b.

As shown in FIG. 5, the construction material 12 is a material for construction composed of the plate type structural face material 12a as its main unit and the plate type vacuum insulation material 14 into one. Because one side of the structural face material 12a is adhered to one side of the vacuum insulation material 14 with an adhesive agent, the structural face material 12a is combined with the vacuum insulation material 14 into one piece. As shown in FIG. 5, the construction material 12 is attached to the wooden axes 7 so that the vacuum insulation material 14 is facing the wooden bases (beams) 9b. As shown in FIG. 6, the surface size of the vacuum insulation material 14 is slightly smaller than surface size of the structural face material 12a. As shown in FIG. 5, a waterproof sheet 15 is located on the vacuum insulation material 14 (between the construction material 12 and wooden bases 9b), and the moisture proof and airtight sheet 16 is located on the structural face material 12a (between the construction material 12 and the wooden axes 7).

As shown in FIG. 6, the vacuum insulation material 14 includes a piece of core material 17 having a surface slightly smaller than a surface of the vacuum insulation material 14. As shown in FIG. 7, the vacuum insulation material 14 is provided with each piece of the core material 17 covered with an exterior covering material 18 having a gas barrier feature and enclosed in a vacuum.

In terms of a material as the core material 17, a material having a high void ratio, preferably 80% or higher as its void ratio, or more preferably 90% or higher as its void ratio, is considered to be appropriate. As those suitable for industrial usage, the material can be made available as fine particles, foam, fiber, etc., and any type of the material is chosen according to its usage application or a characteristic feature required.

In fine particles, inorganic products, organic products and a compound of these are available. For industrial use, it is possible to use a product having dry type silicon dioxide, moisture type silicon dioxide or pearlite, etc. as its main component.

In foam, it is possible to use interconnecting foam such as urethane foam, styrene foam, and phenol foam.

In fiber, inorganic products, organic products and a compound of these are available. However, use of inorganic fiber is preferred from a viewpoint of its heat insulating property. As its inorganic fiber, there are glass wool, glass fiber, alumina fiber, silica alumina fiber, rock wool, etc.

The exterior covering material 18 that composes the vacuum insulation material 14 shall be a laminated film having at least a gas barrier layer and a heat adhesion layer, which can include an additional protection layer if it is necessary to prevent any pinholes on the gas barrier layer getting from getting any damage, friction, bending, lunging, etc.

A heat conduction ratio of the vacuum insulation material 14 is 0.005 W/m·K at average temperature of 24° C., which has a heat insulating property approximately 5 times higher than rigid urethane foam as a general heat insulation material.

As explained above, for the building 11 in the first embodiment, heat insulation work is completed by simply attaching the construction material 12 in which the structural face material 12a and the vacuum insulation material 14 are combined into one, to the wooden axis (beam) 7. By doing so, it is possible to eliminate a conventional process, which is the process to cut a foamed heat insulation material and insert it between wooden bases 9a. Also, overall, it is possible to reduce a usage volume of wooden bases. Furthermore, since the vacuum insulation material 14 having an excellent heat insulating property is used, the heat insulation of the building 11 is quite high and it can contribute to energy saving.

In addition, in the first embodiment, as shown in FIG. 4 to FIG. 6, the construction material 12, which contains the vacuum insulation material 14 having a piece of the core material 17 which has a surface slightly smaller than a surface of the vacuum insulation material 14, is located between the wooden axes 7 and wooden bases 9b. By doing so, a coverage ratio of the vacuum insulation material 14 for the building 11 becomes bigger so that the heat insulating property of the building 11 becomes higher.

Also, in the first embodiment, as shown in FIG. 5, because the waterproof sheet 15 is located on the vacuum insulation material 14, it is possible to avoid external moisture from coming into an inside of the vacuum insulation material 14 and to prevent deterioration of the heat insulating property due to increase in inner pressure of the core material 17.

Moreover, in the first embodiment, as shown in FIG. 5, the moisture proof and airtight sheet 16 is located on the structural face material 12a of the construction material 12, which means it is located between the structural face material 12a and the wooden axis (beam) 7. By doing so, it is possible to prevent a situation in which high-temperature air containing a lot of moisture in the inside of the building builds up dew condensation at a border surface between the structural face material 12a and the vacuum insulation material 14.

Additionally, if a heater is installed under the floor, it is preferable that the construction material 12 is located at an outside of the heater so that it can improve heat releasing efficiency from the heater.

Second Embodiment

Figure 8:
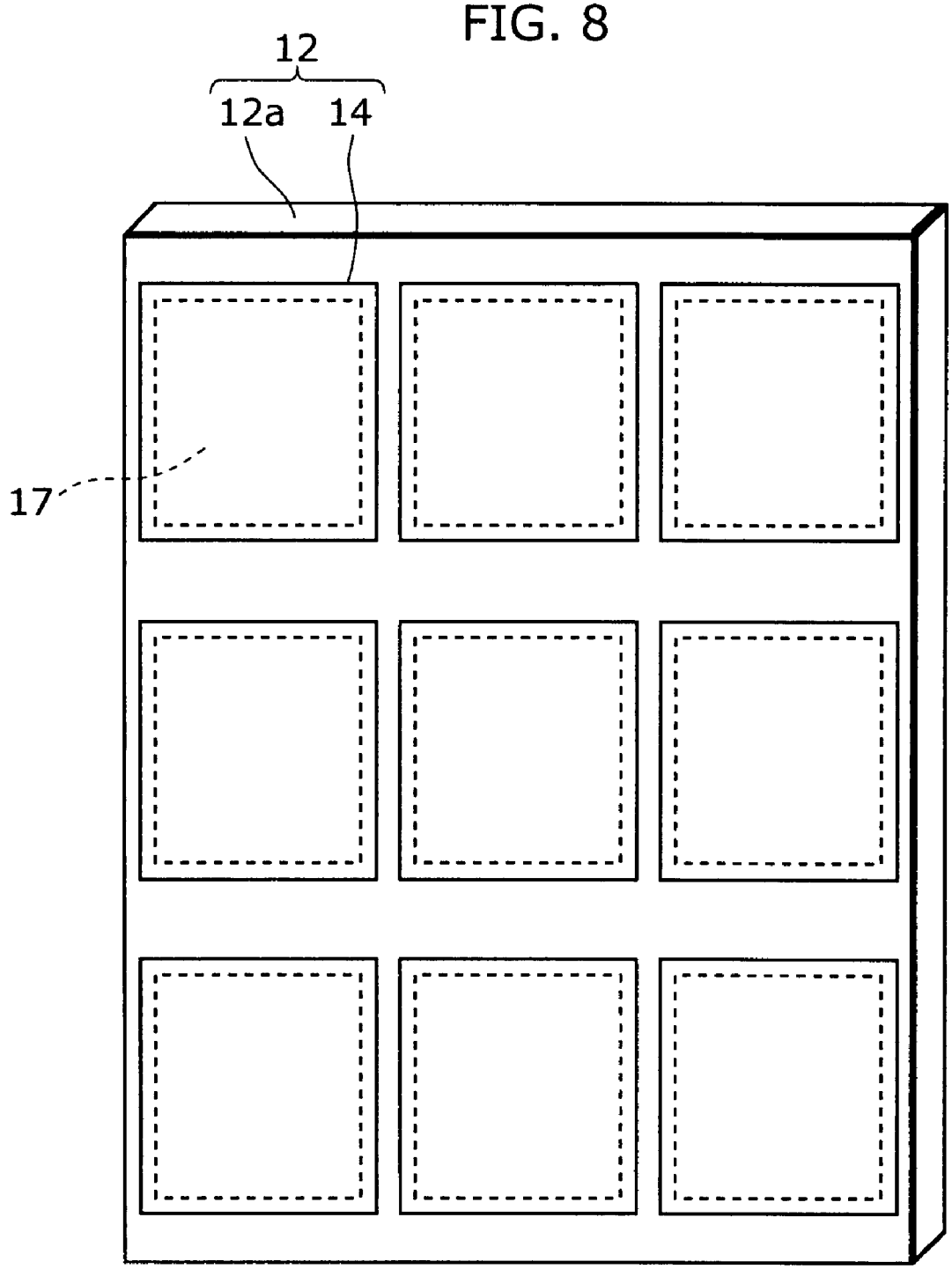
FIG. 8 is an external view diagram of a construction material in a second embodiment.
Figure 9:
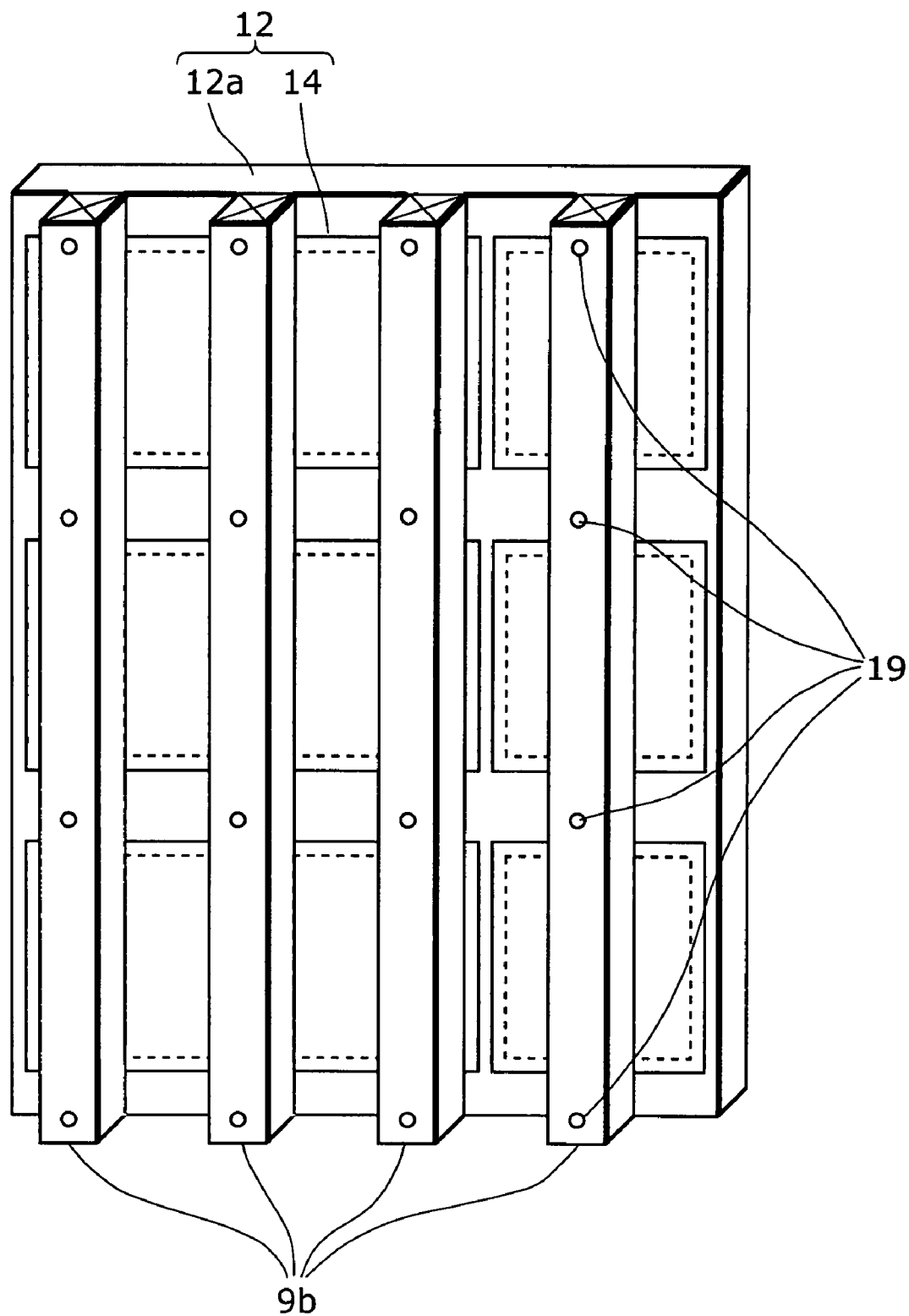
FIG. 9 is a perspective diagram that shows wooden bases are assembled on the construction material in the second embodiment.

FIG. 8 shows an external view diagram of the construction material 12, and FIG. 9 shows a diagram to indicate a situation where the wooden base 9b is assembled on the construction material 12 in the second embodiment.

As shown in FIG. 8, the construction material 12 used in the building 11 in the second embodiment 2 is a construction material in which the structural face material 12a and a plural number of the vacuum insulation material sections 14 are combined into one. To describe it further, the structural face material 12a and a plural number of the vacuum insulation material sections 14 having their surface slightly smaller than a surface of the structural face material 12a are combined into one on the structural face material 12a in a way that the plural number of vacuum insulation material sections 14 do not overlap each other and are located two-dimensionally.

As indicated in FIG. 9, the construction material 12 and the wooden base 9b are fixed by putting a nail 19 in an area away from the core material 17 of the vacuum insulation material 14. They can be fixed with a screw instead of the nail 19. Although it is not shown in FIG. 9, like the first embodiment, it is preferable that the waterproof sheet 15 is located on the vacuum insulation material 14 and that the moisture proof and airtight sheet 16 is located on the structural face material 12a (between the construction material 12 and the wooden axis (beam) 7). In this case, it is desirable to identify a location of the nail 19 so that it stays away from the core material 17 of the vacuum insulation material 14.

As described above, if the construction material 12 in which the structural face material 12a and a plural number of the vacuum insulation material sections 14 are combined into one, is used for the building 11, it is possible in the construction of the building 11, to prevent an overall heat insulating property of the construction material 12 from being deteriorated because, even if the nail 19 is put into any of the core material sections 17 of the vacuum insulation material 14, a degree of vacuum in the vacuum insulation material 14 other than that is not degraded.

Third Embodiment

Figure 10:
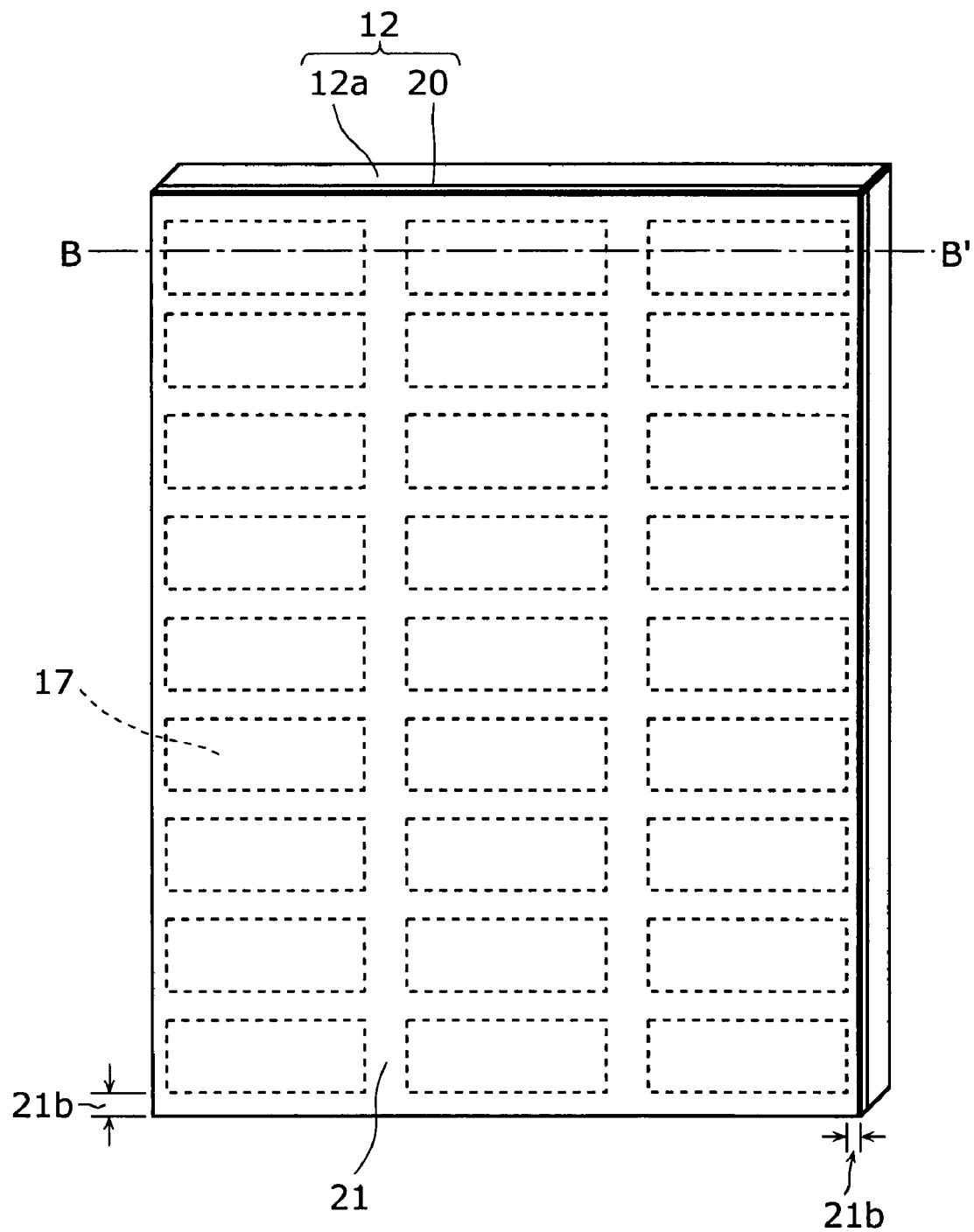
FIG. 10 is an external view diagram of a construction material in a third embodiment.
Figure 11:
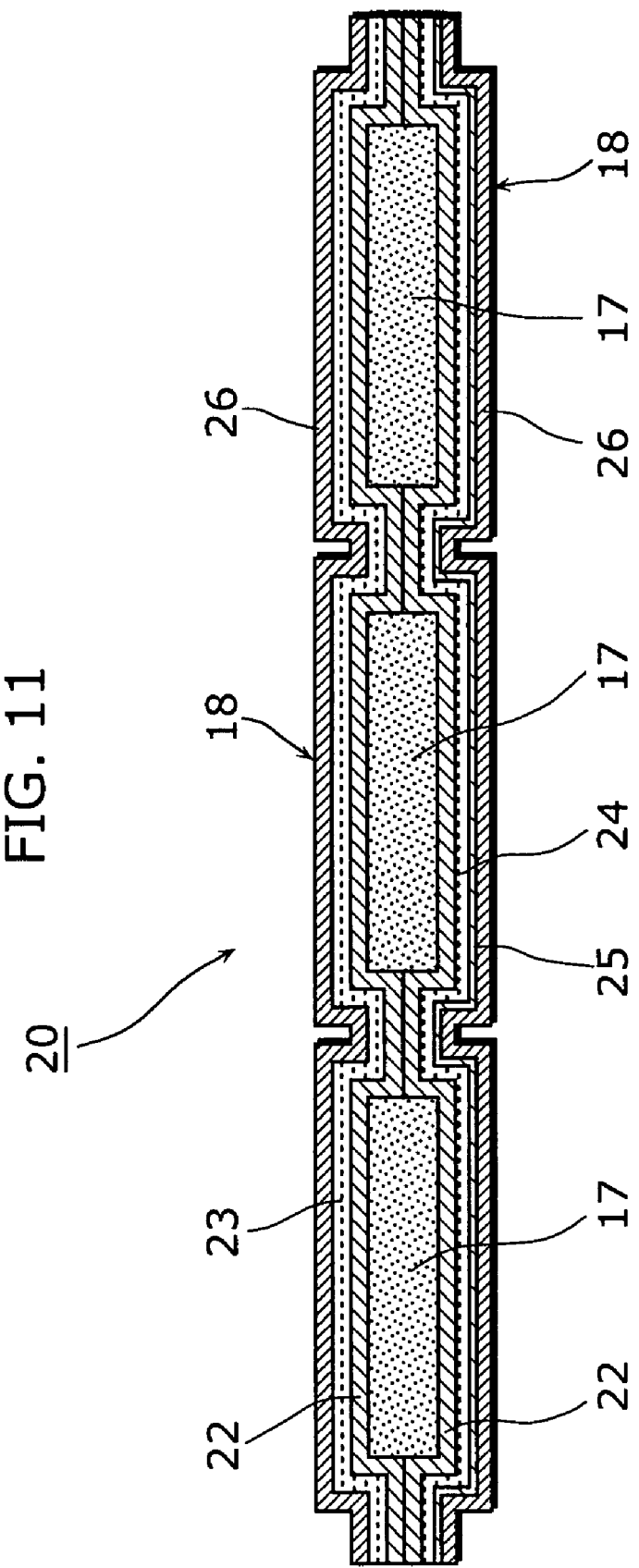
FIG. 11 is a cross section diagram of a B-B' line of a vacuum insulation material making up of the construction material in FIG. 10.
Figure 12:
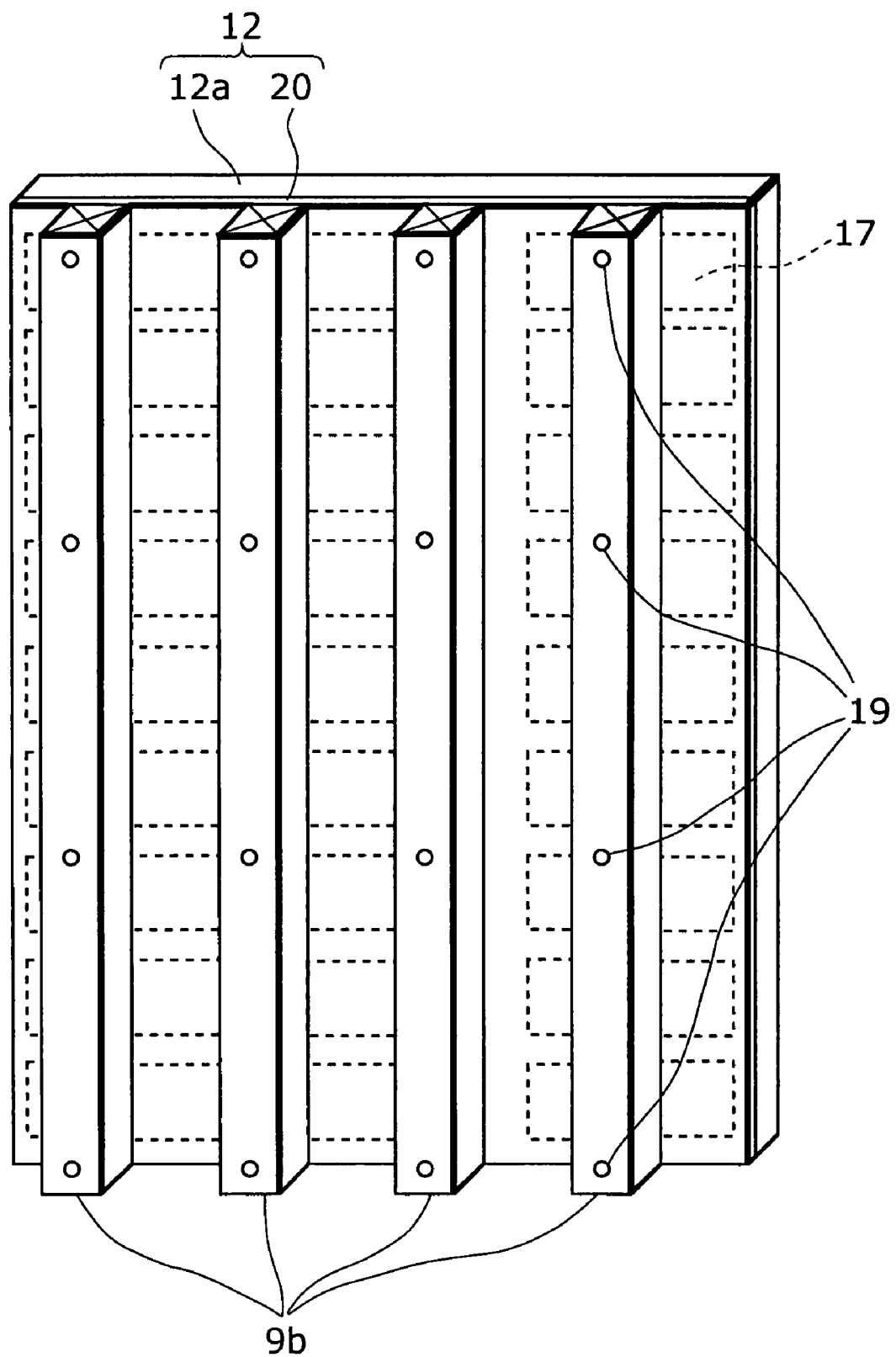
FIG. 12 is a perspective diagram that shows wooden bases 9*b* are assembled on the construction material 12 in the third embodiment.

FIG. 10 is an external view of the construction material 12, FIG. 11 is a cross section diagram on a B-B' line of a vacuum insulation material 20 composing the construction material 12 in FIG. 10, and FIG. 12 is a diagram to show a situation where the wooden base 9b is assembled on the construction material 12.

As shown in FIG. 10, the construction material 12 used for the building 11 in the third embodiment 3 is a construction material in which the structural face material 12 and the vacuum insulation material 20 are combined into one.

The vacuum insulation material 20 is provided with a plural number of equally-sized core material sections 17, which are located two-dimensionally without being overlapped on each other, covered from their top and bottom with two pieces of the exterior covering material 18, and vacuum-enclosed. In the vacuum insulation material 20, since there is no core material sections 17 between the top and the bottom of the exterior covering material 18, almost all of the area where the top and the bottom of the exterior covering material 18 can be adhered in air pressure is a heat adhesion area 21 of the exterior covering material 18 so that each of the core material sections 17 is individually vacuum-enclosed. The heat adhesion area 21 is an area where an upper part and a lower part of the exterior covering material 18 are melted and bound with heat, so that each of the core material sections 17 is located in independent space. Here, a reason why an expression "almost all" instead of "all" is used is because there might be a case that, due to a slight difference in size or shape between the two pieces of the exterior covering material 18, or a difference in size or shape between the exterior covering material 18 and a heat adhesion device, the very end of the peripheral edge of the vacuum insulation material 20 cannot be adhered with heat or is not intentionally adhered to the end with heat. Besides, depending on a following capability (flexibility) of the heat adhesion device for a shape of the core material in a part where heat and pressure are applied on the vacuum insulation material 20, it may not be possible to adhere with heat to the end of the core material.

As shown in FIG. 11, the exterior covering material 18 of the vacuum insulation material 20 has a laminate structure, consisting of a heat adhesion layer 22, a gas barrier layer (a metallic foil layer 23, a metal vacuum evaporation layer 24, and a polyacrylic resin layer 25), and a protection layer 26 located in order from the core material 17 side.

The heat adhesion layer 22 is for vacuum-enclosing the inside of the exterior covering material 18 when heat and pressure are applied to it. As the heat adhesion layer 22, low-density polyethylene film, chain-like low-density polyethylene film, polypropylene film, polyacrylonitrile film, etc. and a compound of these can be used.

The gas barrier layer is to prevent air from coming into the core material 17 through an external surface of the exterior covering material 18. In the third embodiment, the metallic foil layer 23 located at one side of the core material 17, the metal vacuum evaporation layer 24 and the polyacrylic resin layer 25 located at other side of the core material 17 are the gas barrier layers. The polyacrylic resin layer 25 is located on the metal vacuum evaporation layer 24.

The protection layer 26 is a layer that prevents a pinhole from occurring on the gas barrier layer due to damages, friction, bending with dust or dirt, or lunging with a stick type of a material such as a nail on the external surface of the exterior covering material 18. As the protection layer 26, a nylon film, a polyethylene terephthalate film, etc. can be used.

A heat conduction ratio of the vacuum insulation material 20 is 0.005 W/m·K at average temperature of 24° C., which has a heat insulating property approximately 5 times higher than rigid urethane foam as a general heat insulation material.

As indicated in FIG. 12, the construction material 12 and the wooden base 9b are fixed by putting a nail 19 in an area away from the core material 17 of the vacuum insulation material 20. In short, the nail 19 is put into the heat adhesion area 21 so that the wooden base 9b is fixed on the construction material 12. The wooden base 9b can also be fixed with a screw instead of the nail 19. Although it is not shown in FIG. 12, like the first embodiment, it is preferable that the waterproof sheet 15 is located on the vacuum insulation material 20 and that the moisture proof and airtight sheet 16 is located on the structural face material 12a (between the construction material 12 and the wooden axis (beam) 7).

As described above, in the third embodiment, the construction material 12 includes the vacuum insulation material 20, in which a plural number of the core materials 17 individually exist in independent space and are enclosed in a vacuum, and the insulation material is combined with the structural face material 12a into one piece, the construction material 12 is used for the building 11. Therefore, in the construction of the building 11, it is possible to prevent an overall heat insulating property of the construction material 20 from being deteriorated because, even if a nail or a screw is put into any of the core material sections 17 of the vacuum insulation material 20, a degree of the vacuum effect in the other vacuum insulation material sections 17 is not degraded.

Also, in the third embodiment, as one surface of the exterior covering material 18 of the vacuum insulation material 20 is a laminate film having the metal vacuum evaporation layer 24 and other surface of it is a laminate film having the metallic foil layer 23, heat capacity is different between the metallic foil layer 23 and the metal vacuum evaporation layer 24. Therefore, it is possible to restrain heat leakage that occurs through a joining surface of these two pieces of the laminate films when the vacuum insulation material 20 is used. In the third embodiment, since the vacuum insulation material 20 has a plural number of the core materials 17, a ratio of the joining surface of the two pieces of the laminate films gets bigger. Consequently, the effect to prevent heat leakage becomes bigger because heat capacity is different between the metallic foil layer 23 and the metal vacuum evaporation layer 24.

Additionally, in the third embodiment, there is the polyacrylic resin layer 25 on the metal vacuum evaporation layer 24 of the exterior covering material 18, a gas barrier effect is improved when it is compared with a case having a single layer of the metal vacuum evaporation layer 24 so that the heat insulating property of the vacuum insulation material 20 can be maintained for a long period.

Furthermore, in the third embodiment, all of the areas where the core material 17 of the exterior covering material 18 of the vacuum insulation material 20 is not sandwiched are adhered with heat (Reference: the heat adhesion area 21). Therefore, just as shown in FIG. 13A, compared with width 21bx of a fin part (a non-core part) at an edge of the vacuum insulation material 20x in a case a part 21x of an area the core material 17 of the exterior covering material 18 is not sandwiched, it is possible to reduce the width 21b of the fin part (the non-core part) at the edge of the vacuum insulation material 20 shown in FIG. 10. By doing so, area of the core material 17 occupied on the surface of the vacuum insulation material 20 becomes bigger, a ratio of an effective heat insulation area on the surface of the vacuum insulation material 20 gets bigger so that the heat insulating effect can be increased.

Figure 13:
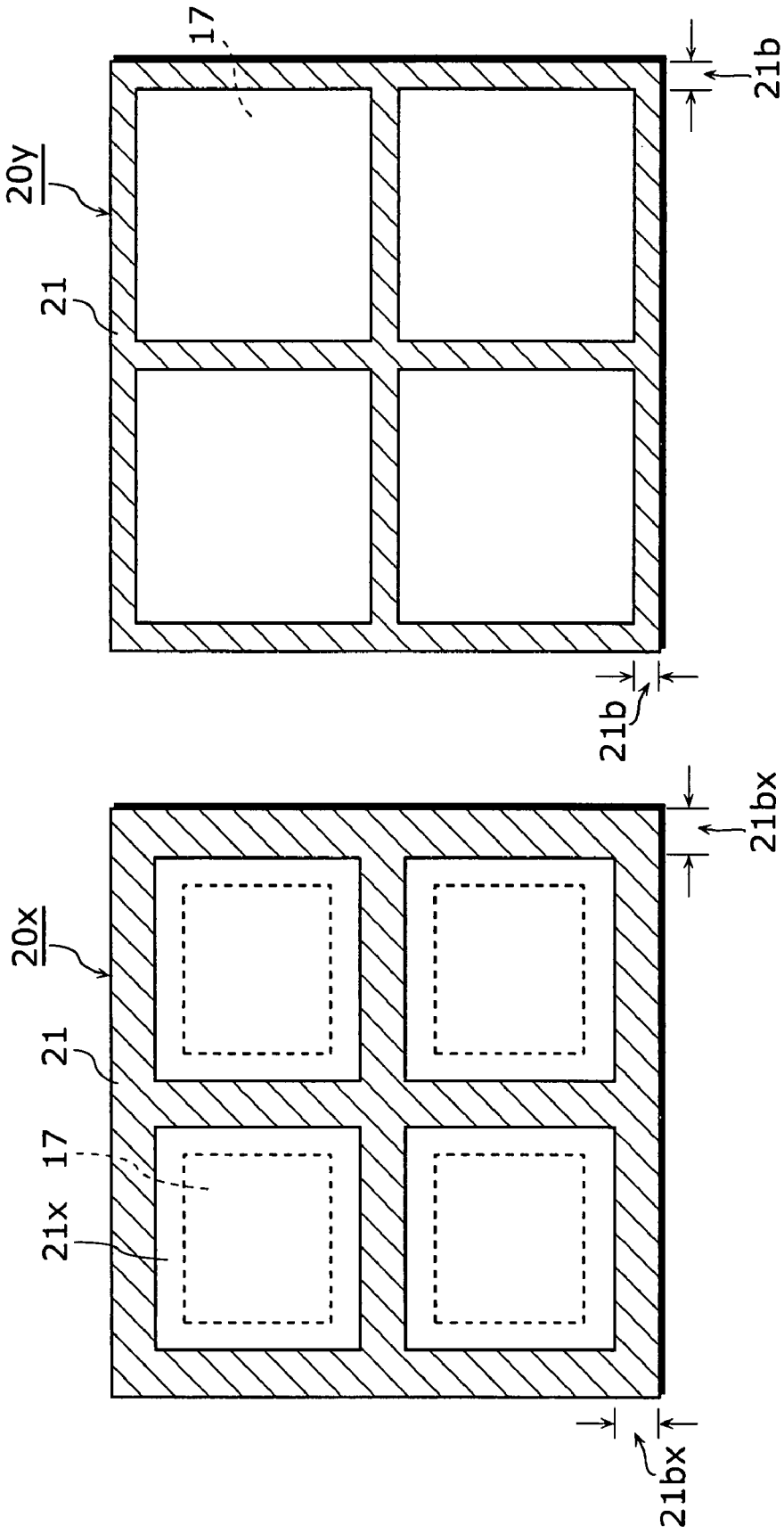
FIG. 13A is a first diagram for explaining the width of a fin part (a non-core part) 21b at an edge of the vacuum insulation material 20.
FIG. 13B is a second diagram for explaining the width of the fin part (the non-core part) 21b at the edge of the vacuum insulation material 20.

In order to further explain the above, FIG. 13B is shown. FIG. 13B is a diagram to compare with FIG. 13A. It is a diagram to explain that the width 21b of the fin part (the non-core part) shown in FIG. 13B can be reduced, as compared with the width 21b of the fin part (the non-core part) shown in FIG. 13A. As shown in FIG. 13B, all of the areas where the core material 17 of the exterior covering material 18 is not inserted is adhered with heat (Reference: the heat adhesion area 21). If the area 21x as shown in FIG. 13A, which is not adhered with heat, does not exist, the width 21b of the fin part (the non-core part) shown in FIG. 13 B can be reduced, compared with the width 21bx of the fin part (non-core part) showing FIG. 13A because the part 21x does not exist. By doing so, the area of the core material 17 on the surface of the vacuum insulation material 20y becomes bigger, compared with the vacuum insulation material 20x shown in FIG. 13A. Therefore, a ratio of an effective heat insulation area on the surface of the vacuum insulation material 20y becomes bigger, which improves the head insulation effect.

Figure 14:
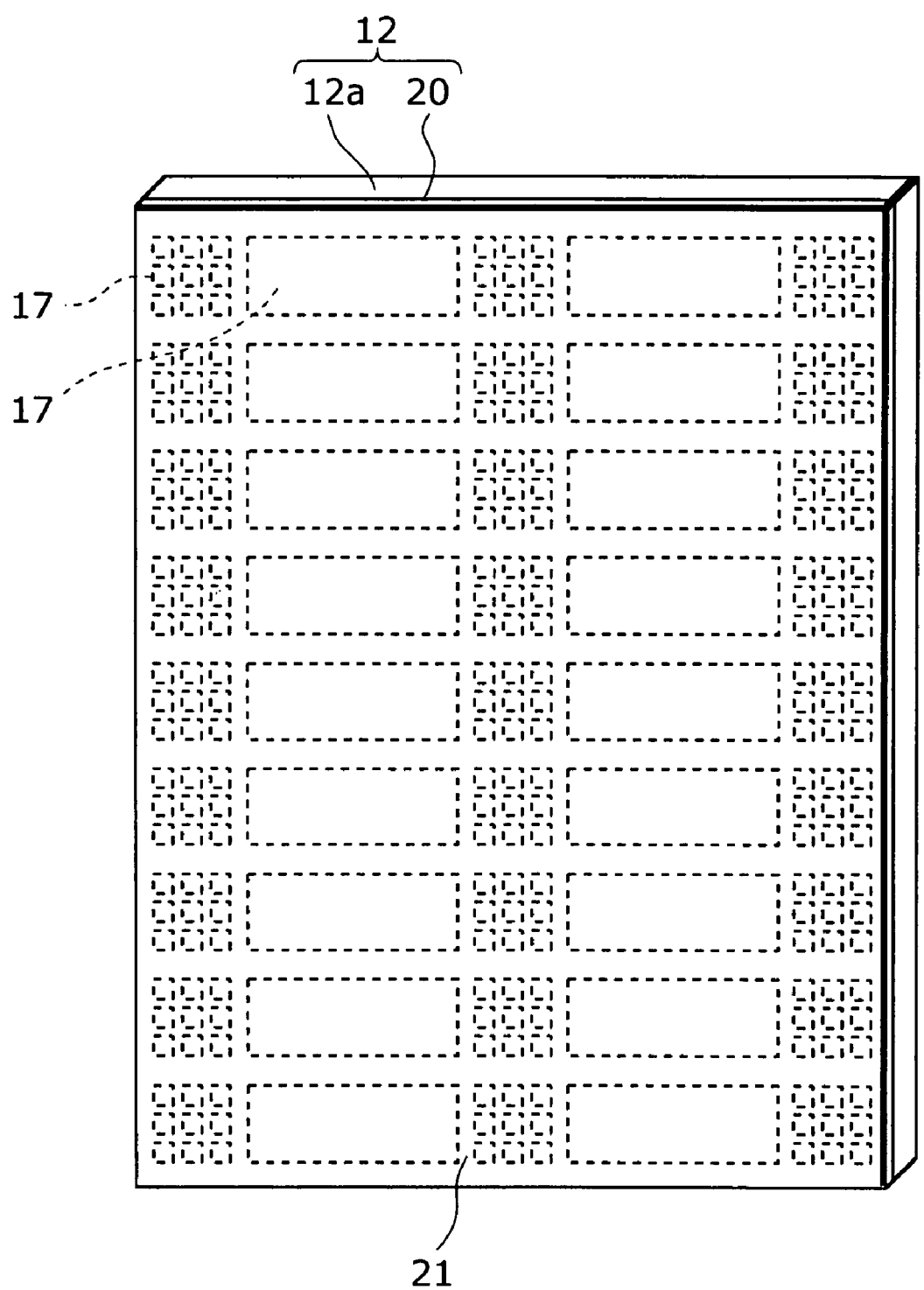
FIG. 14 is an external view diagram of a construction material as a transformation example of the third embodiment.

Also, in the third embodiment, as shown in FIG. 10, size of the plural number of the core materials 17 is identical. However, the size of the plural number of the core materials 17 can be different as shown in FIG. 14. For example, size of the core material 17 in an area where the nail 19 may be driven later is made to be smaller than the other area. By doing so, even if the nail 19 is actually driven into any of the core material 17 in any of the area where the nail 19 may possibly be driven in, the area size of the core material 17 is small so that the size of the area that looses a vacuum condition is smaller than the case size of a plural number of the core materials 17 is identical. In other words, the size of the core material 17 that keeps the vacuum condition becomes bigger. As a result, it is possible to maintain a high level of a heat insulating property in the vacuum insulation material 20 as a whole.

In addition, since the construction material 12 can be bent at a section (the heat adhesion area 21) of the core material 17, it gives bending flexibility if the size of the core material 17 is kept small. Moreover, if the size of the core material 17 in a part that needs to be bent is kept smaller, and if the size of the core material 17 in a part that does not need to be bent is kept bigger, it makes it possible to bend only at a specific part in the construction material 12.

Furthermore, configuration and thickness of the plural number of the core materials 17 may be different.

Figure 15:
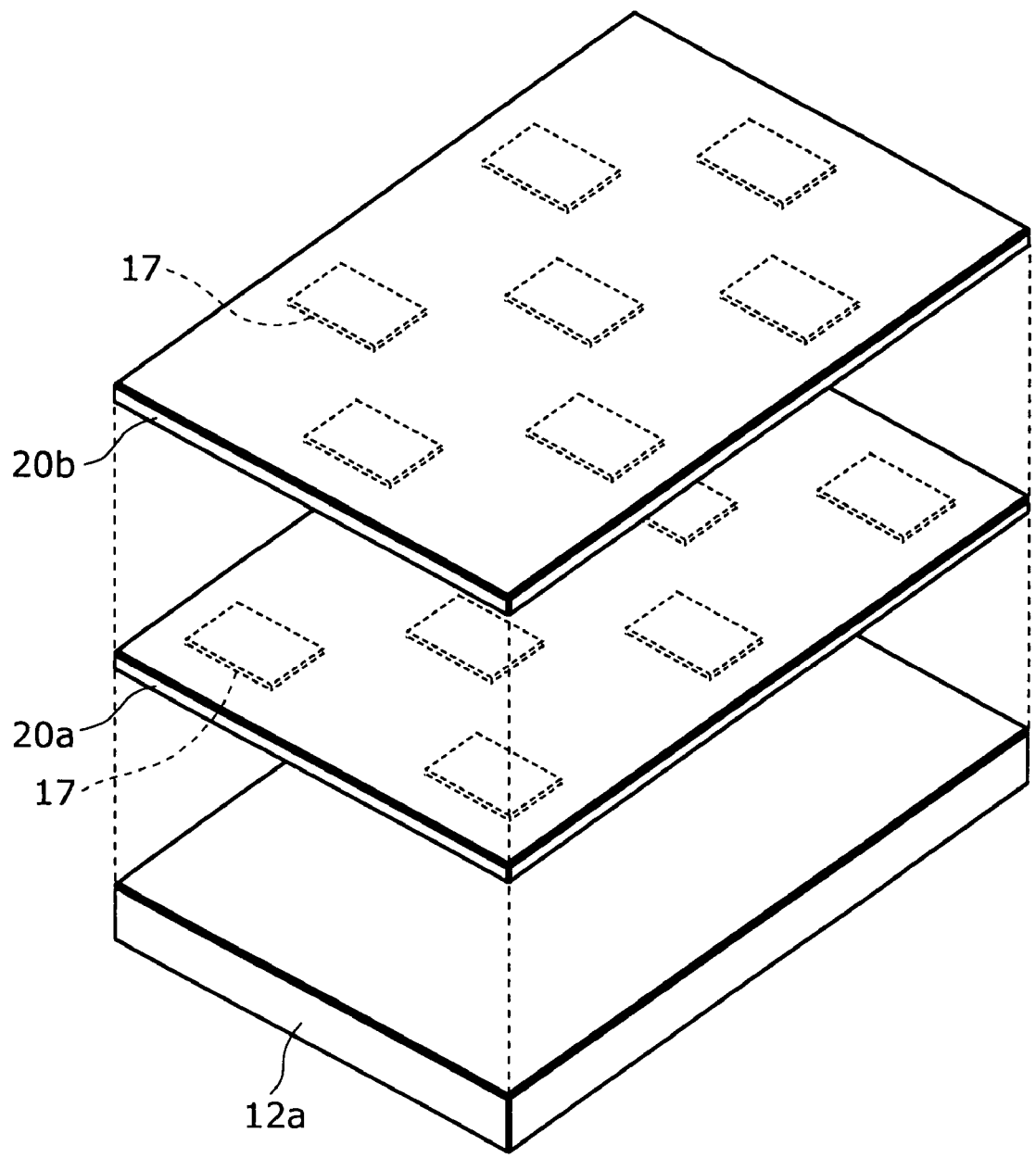
FIG. 15 is an exploded perspective view diagram of the construction material 12 as the transformation example of the third embodiment.

In addition, as shown in FIG. 15, regarding the construction material 12, the vacuum insulation material 20a and the vacuum insulation material 20b can be stacked as a layer and combined into one on the structural face material 12a. In this case, it is preferable that the vacuum insulation material 20a and the vacuum insulation material 20b are stacked in such a way that the core material sections 17 are not overlapped. By adjusting size and one side or both sides of the number of the core material sections 17, it is possible to combine the structural face material 12a with the stacked vacuum insulation material 20a and vacuum insulation material 20b in order to make the core material 17 also be located on a part of the heat adhesion area 21 if a piece of the vacuum insulation material 20 is used. As a result of it, it improves a heat insulating property. By the way, three or more pieces of the vacuum insulation material 20 may be stacked and combined into one with the structural face material 12a.

Fourth Embodiment

Figure 16:
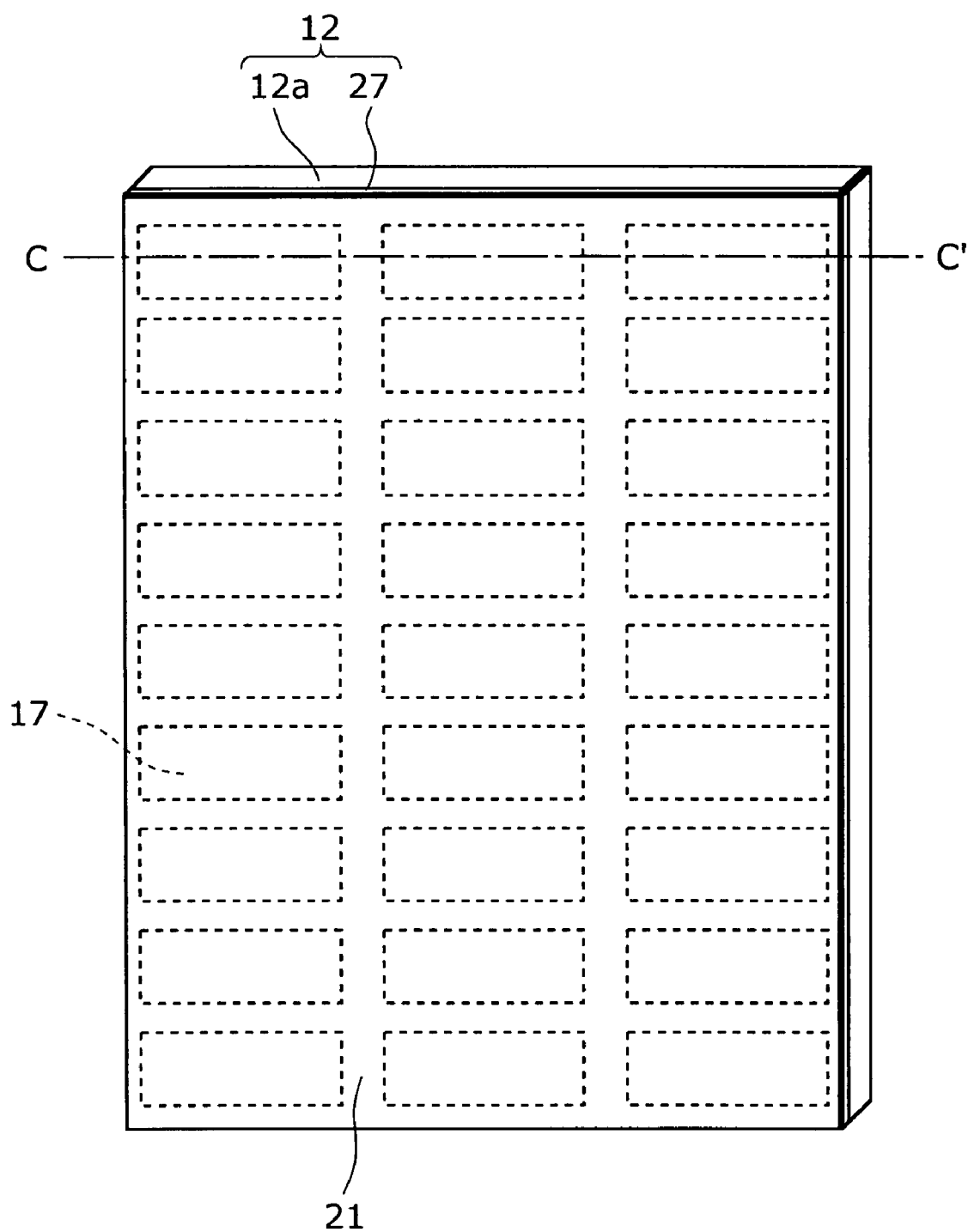
FIG. 16 is an external view diagram of a construction material in a fourth embodiment.
Figure 17:
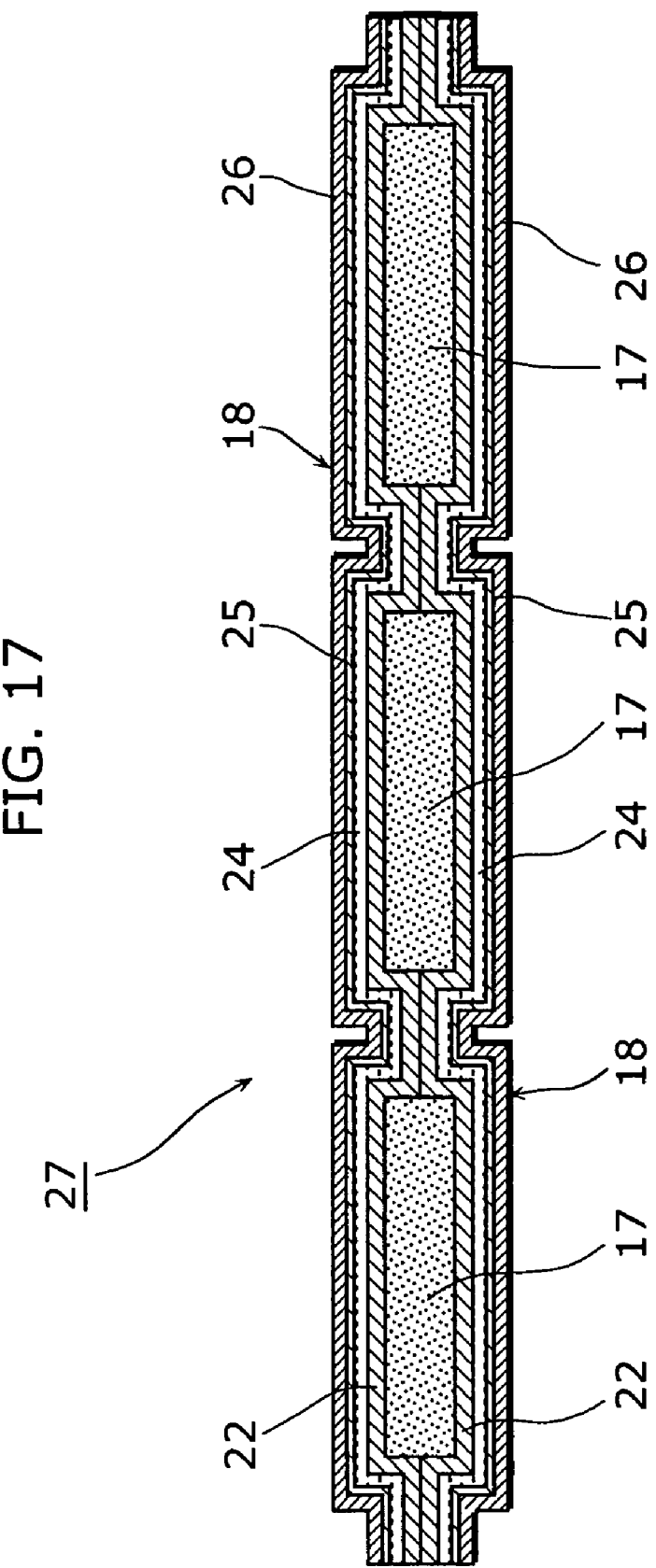
FIG. 17 is a cross section diagram on a C-C' line of a vacuum insulation material making up of the construction material in FIG. 16.

FIG. 16 is an external view of the construction material 12 in the fourth embodiment, and FIG. 17 is a cross section view of a C-C' line of a vacuum insulation material section 27 composing the construction material 12 in FIG. 16.

As shown in FIG. 16, the construction material 12 used for the building 11 in the fourth embodiment is a construction material in which the structural face material 12a and the vacuum insulation material sections 27 are combined into one.

The vacuum insulation material section 27 is provided by covering a plural number of the core materials sections 17 with a piece of the exterior covering material 18 and having them enclosed in a vacuum. In the vacuum insulation material 27, all parts where the core material sections 17 do not exist are the heat adhesion area 21 of the exterior covering material 18, and each of the core material sections 17 is individually vacuum-enclosed. The heat adhesion area 21 makes each of the core material 17 exist in independent space.

As shown in FIG. 17, the exterior covering material 18 of the vacuum insulation material section 27 has a laminate structure, consisting of the heat adhesion layer 22, the gas barrier layer (the metal vacuum evaporation layer 24 and the polyacrylic resin layer 25), and the protection layer 26 located in order from the core material 17 side. The vacuum insulation material 27 in the fourth embodiment has the same configuration as the vacuum insulation material 20 in the third embodiment except the structure of the gas barrier layer.

The gas barrier layer is for preventing air from coming into the core material 17 through an external surface of the exterior covering material 18, and in the fourth embodiment, the metal vacuum evaporation layer 24 and the polyacrylic resin layer 25 on both sides of the exterior covering material 18 are the gas barrier layer. The polyacrylic resin layer 25 is located on the metal vacuum evaporation layer 24.

A heat conduction ratio of the vacuum insulation material section 27 is 0.005 W/m·K at average temperature of 24° C., which has a heat insulating property approximately 5 times higher than rigid urethane foam as a general heat insulation material.

As described above, in the fourth embodiment, the construction material 12, in which the vacuum insulation material 27, whose plural number of core material sections 17 individually exist in independent space and are vacuum-enclosed, is combined with the structural face material 12a into one is used for the building 11. Since both sides of the exterior covering material 18 of the vacuum insulation material 27 are the metal vacuum evaporation layer 24 having a small heat capacity, it has a high level of effects that restrain heat leakage occurring through its joining surface, which improves the heat insulating effect of the vacuum insulation material 27.

Fifth Embodiment

Figure 18:
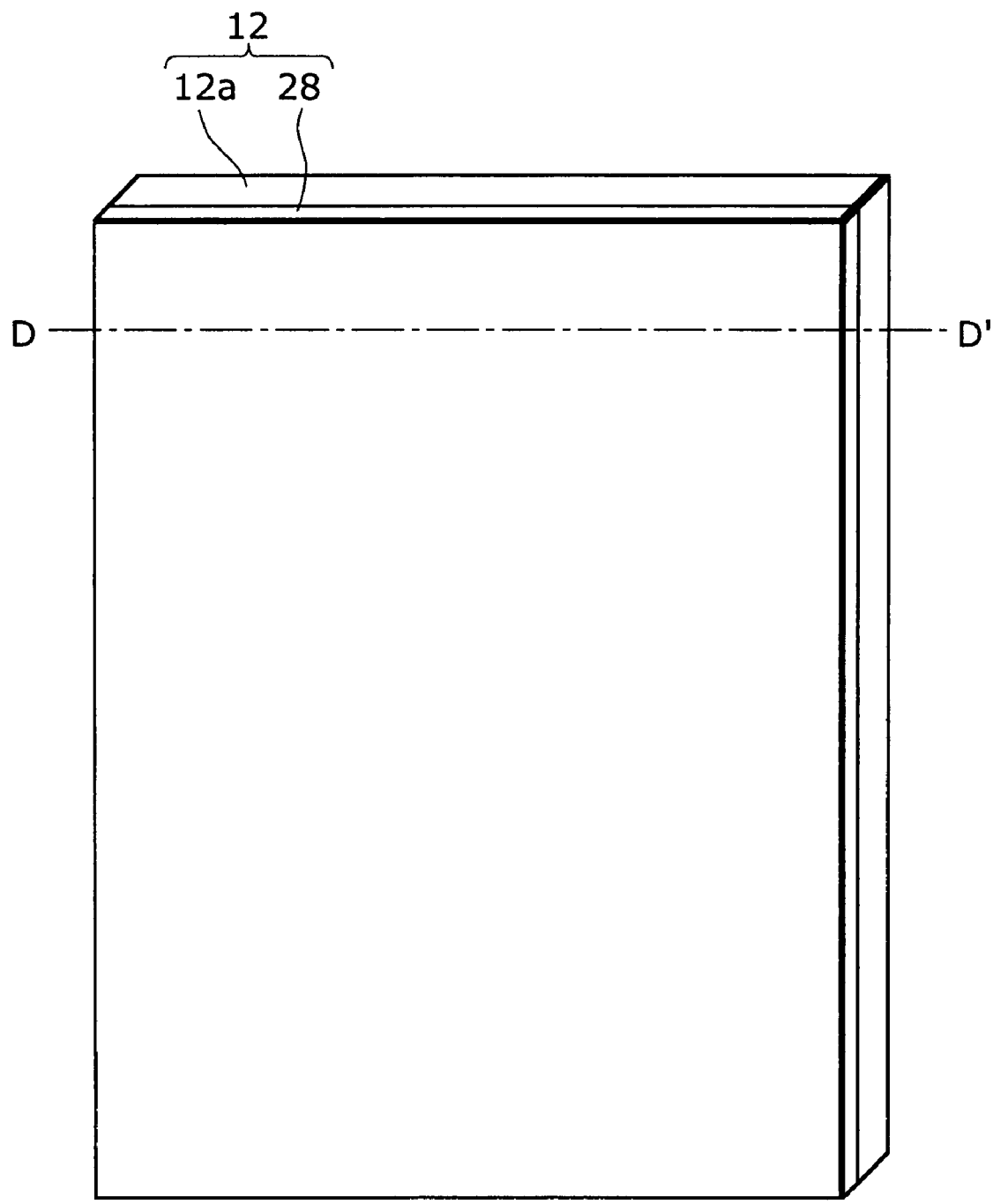
FIG. 18 is an external view of a construction material in a fifth embodiment.
Figure 19:
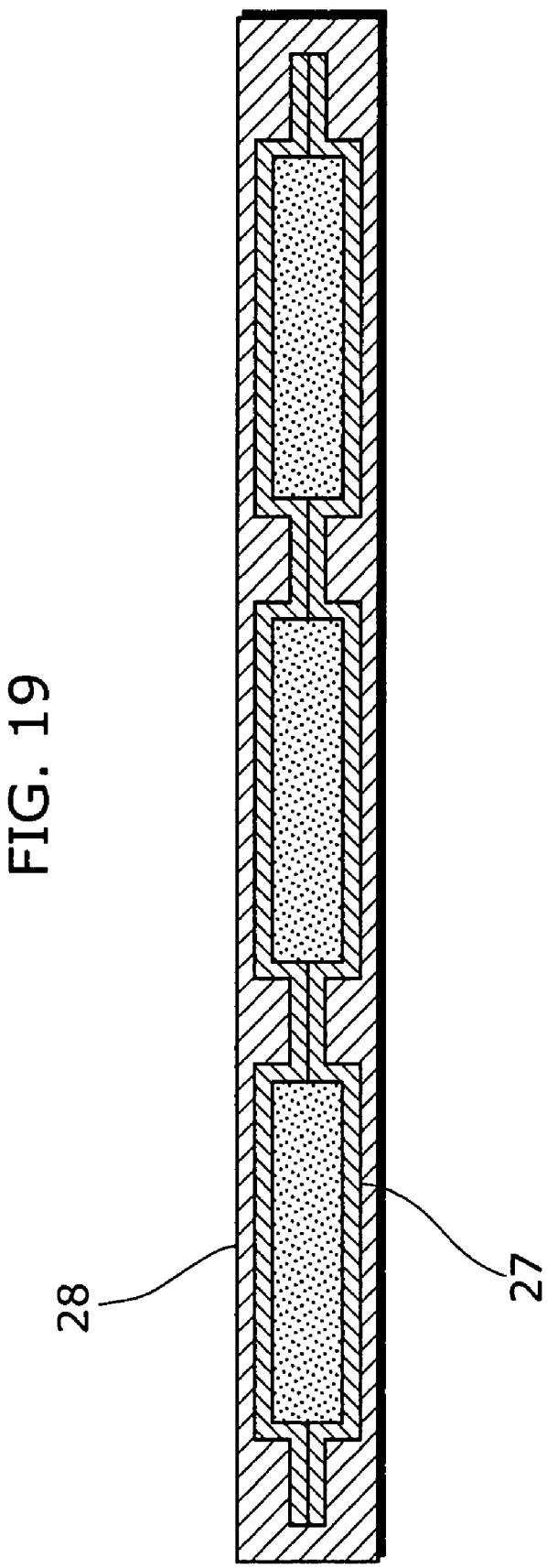
FIG. 19 is a cross section diagram on a D-D' line of rigid polyurethane foam making up of the construction material 12 in FIG. 18.

FIG. 18 is an external view of the construction material 12 in the fifth embodiment, and FIG. 19 is a cross section diagram on a D-D' line of rigid polyurethane foam 28 composing the construction material 12 in FIG. 18.

As shown in FIG. 18, the construction material 12 used for the building 11 in the fifth embodiment is a construction material in which the structural face material 12a and the rigid polyurethane foam 28 are combined into one.

The rigid polyurethane foam 28 is generated, as shown in FIG. 19, by forming foam urethane molecules in a way the vacuum insulation material 27 in the fourth embodiment is included. By the way, as the rigid polyurethane foam 28, any of the vacuum insulation materials in the first embodiment through the third embodiment may be included.

As described above, in the fifth embodiment, the construction material 12 in which the structural face material 12a and the rigid polyurethane foam 28 that includes a vacuum insulation material such as the vacuum insulation material 27 described in the fourth embodiment, are combined into one is used for the building 11. Since the vacuum insulation material is not exposed outside, it is possible to restrain a vacuum insulation material pouch from being broken by some foreign material or handling failures at a construction site.

Also, by using the rigid polyurethane foam 28, the heat insulating property is further enhanced so that it further improves a heat insulating property of the building 11.

In addition, by using the rigid polyurethane foam 28, structural strength of the construction material 12 is increased so that it improves portability and efficiency of handling work, which generates planarity.

The rigid polyurethane foam 28 is one example of the foam type heat insulation material.

Sixth Embodiment

Figure 20:
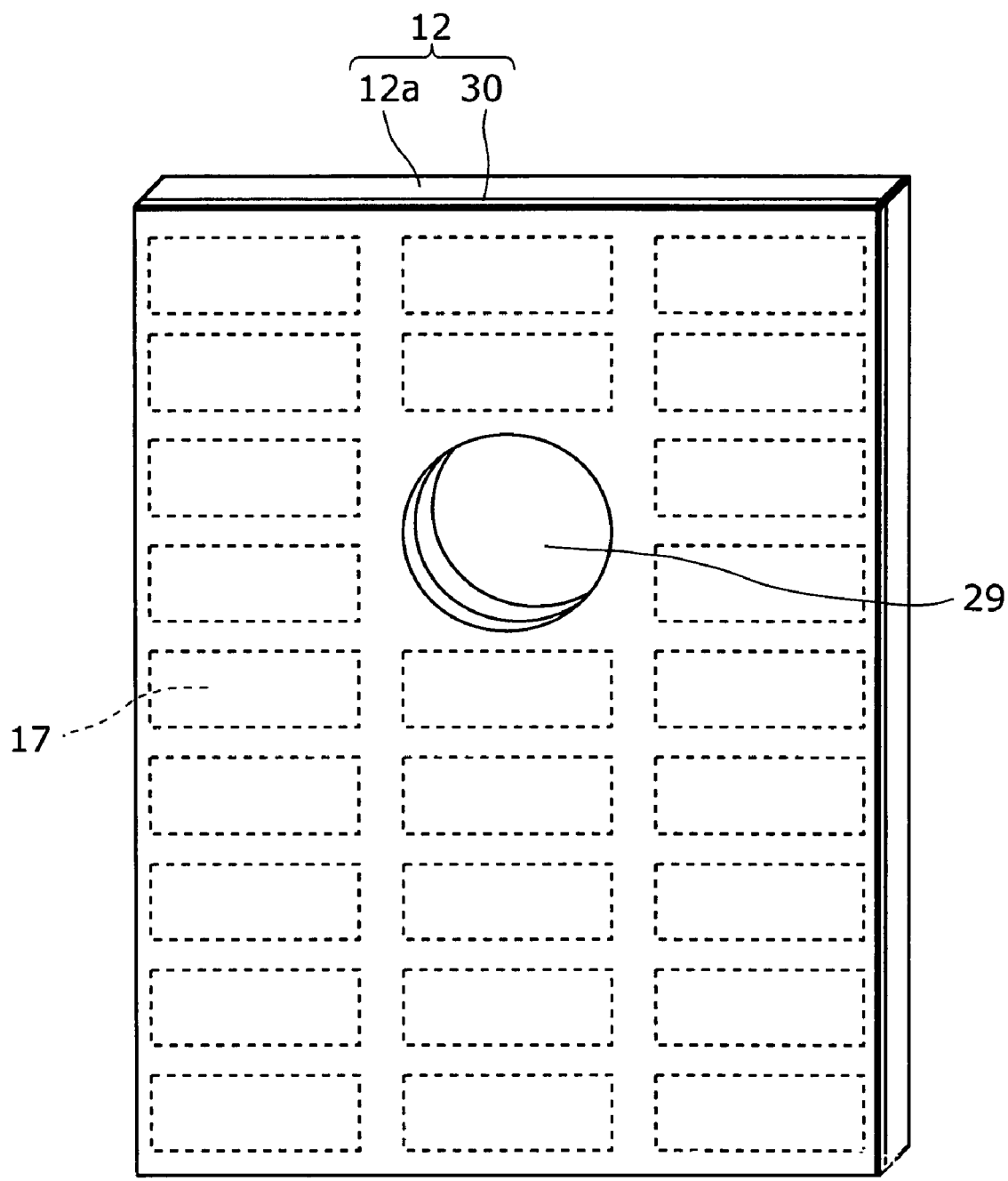
FIG. 20 is an external view of a structural face material 12 in a sixth embodiment.

FIG. 20 is an external view diagram of the construction material 12 in the sixth embodiment.

As shown in FIG. 20, the construction material 12 used for the building 11 in the sixth embodiment is a material in which the structural face material 12a having the through-hole 29 in its thickness direction and the vacuum insulation material 30 having the through-hole 29, again, in its thickness direction are combined into one in a way these through-holes 29 are overlapping each other.

A configuration of the vacuum insulation material 30 is the same as one of the vacuum insulation materials in the embodiments described before except the through-hole 29. The vacuum insulation material in the embodiment described before may be the vacuum insulation material 20, or the vacuum insulation material 27, or may be the vacuum insulation material 14.

As described above, in the sixth embodiment, because the construction material 12 having the through-hole 29 is used for the building 11, it is possible to install some equipment such as a ventilation fan that needs to penetrate through the inside and outside of the building 11 without deteriorating the heat insulating property.

Seventh Embodiment

Figure 21:
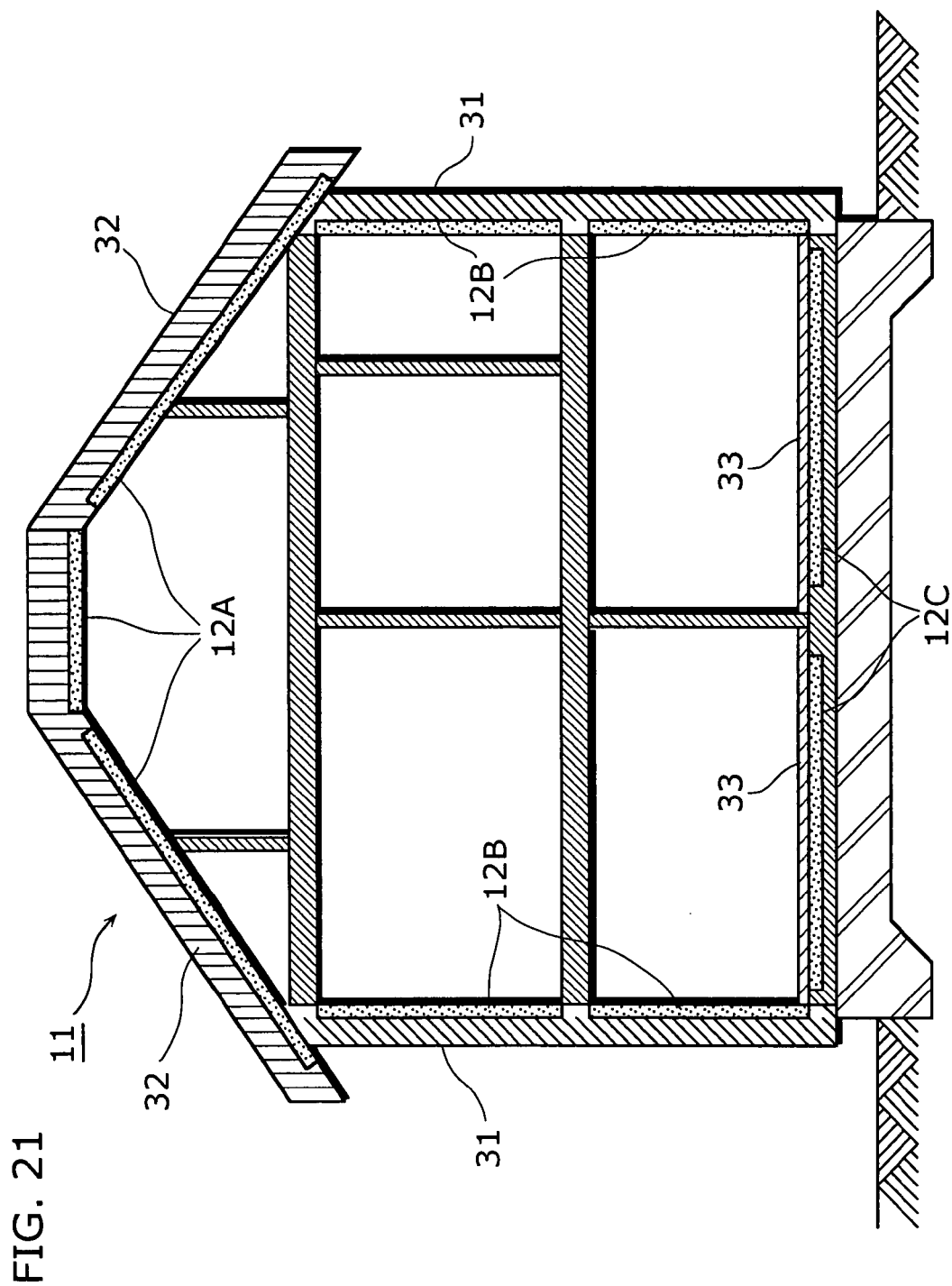
FIG. 21 is an overview cross section diagram of a building in a seventh embodiment.

FIG. 21 is a rough cross section diagram of the building 11 in the seventh embodiment.

As shown in FIG. 21, the building 11 in the seventh embodiment has the same structure as those in the embodiments described before, and it has the construction materials 12A, 12B and 12C shown in FIG. 6, which have structure in which the vacuum insulation material 14 and the structural face material 12a are combined into one, installed an internal part of a wall 31 and of a roof 32 and a bottom part of a floor material 33.

Thickness of the vacuum insulation material 14 is decided to gain a specific degree of heat insulating effect.

For example, if the building 11 is located in a cold region, thickness of the vacuum insulation material 14 becomes bigger. Also, depending on a part of the building 11, thickness of the vacuum insulation material 14 installed may be different. In the seventh embodiment, the vacuum insulation material 14 of the construction material 12A is 5 mm in thickness, the vacuum insulation material 14 of the construction material 12B is 7 mm in thickness, and the vacuum insulation material 14 of the construction material 12C is 3 mm in thickness.

As explained above, in the seventh embodiment, a degree of heat insulation for the building 11 is designed according to the thickness of the vacuum insulation material 14. Because of this, according to a climate condition in a region where the building 11 is constructed and an intended purpose of each room in the building 11, etc., it is possible to optimize a coefficient of heat loss in each part of the building 11. As a result, it makes it possible to build the building 11 comfortable for a resident.

By the way, the construction materials 12A, 12B and 12C may be a construction material in which the vacuum insulation material 20 is combined with the vacuum insulation material 27 into one, or the vacuum insulation material 30 is combined with the structural face material 12a into one.

Eighth Embodiment

Figure 22:
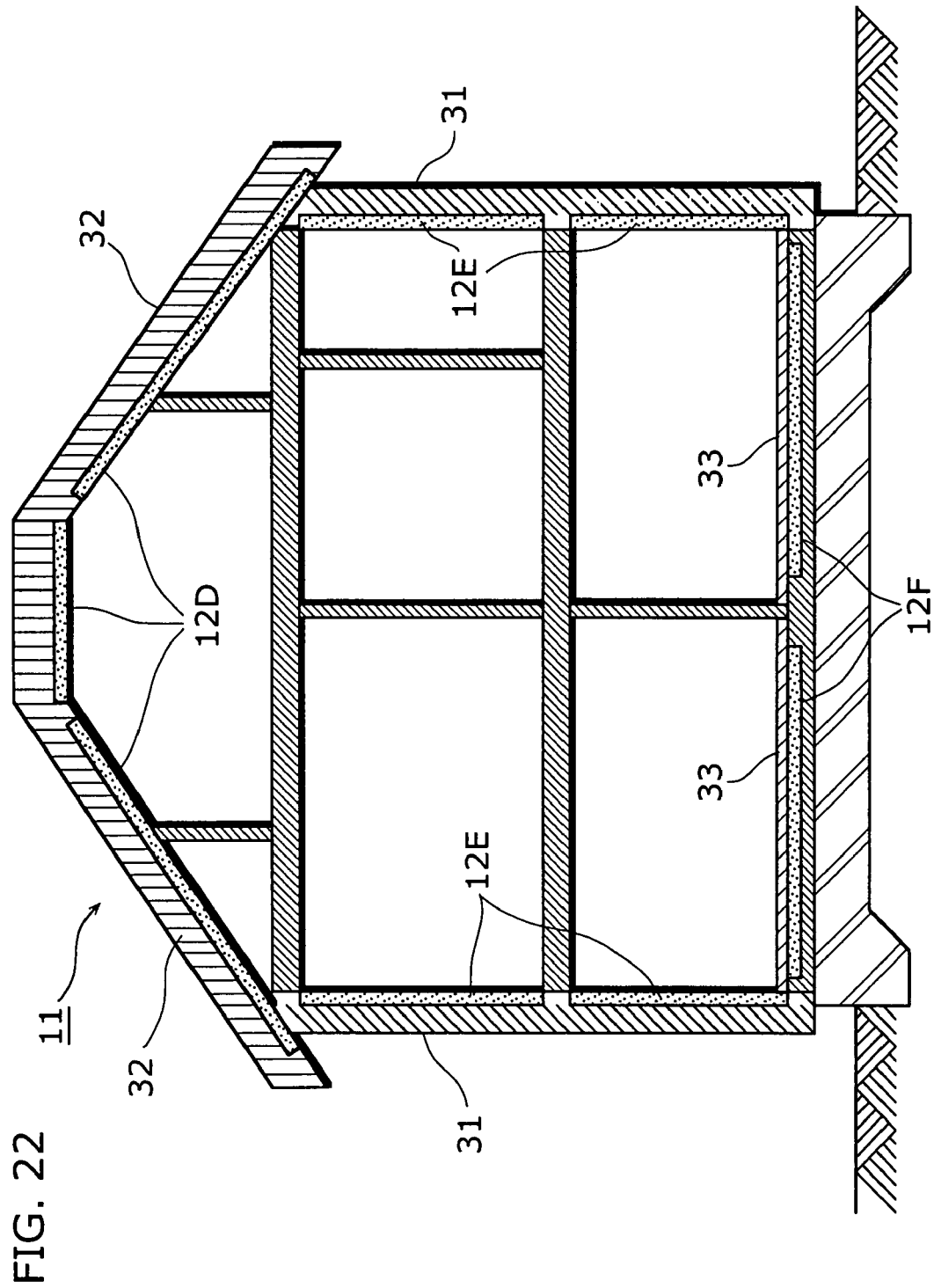
FIG. 22 is an overview cross section diagram of a building in an eighth embodiment.
Figure 23:
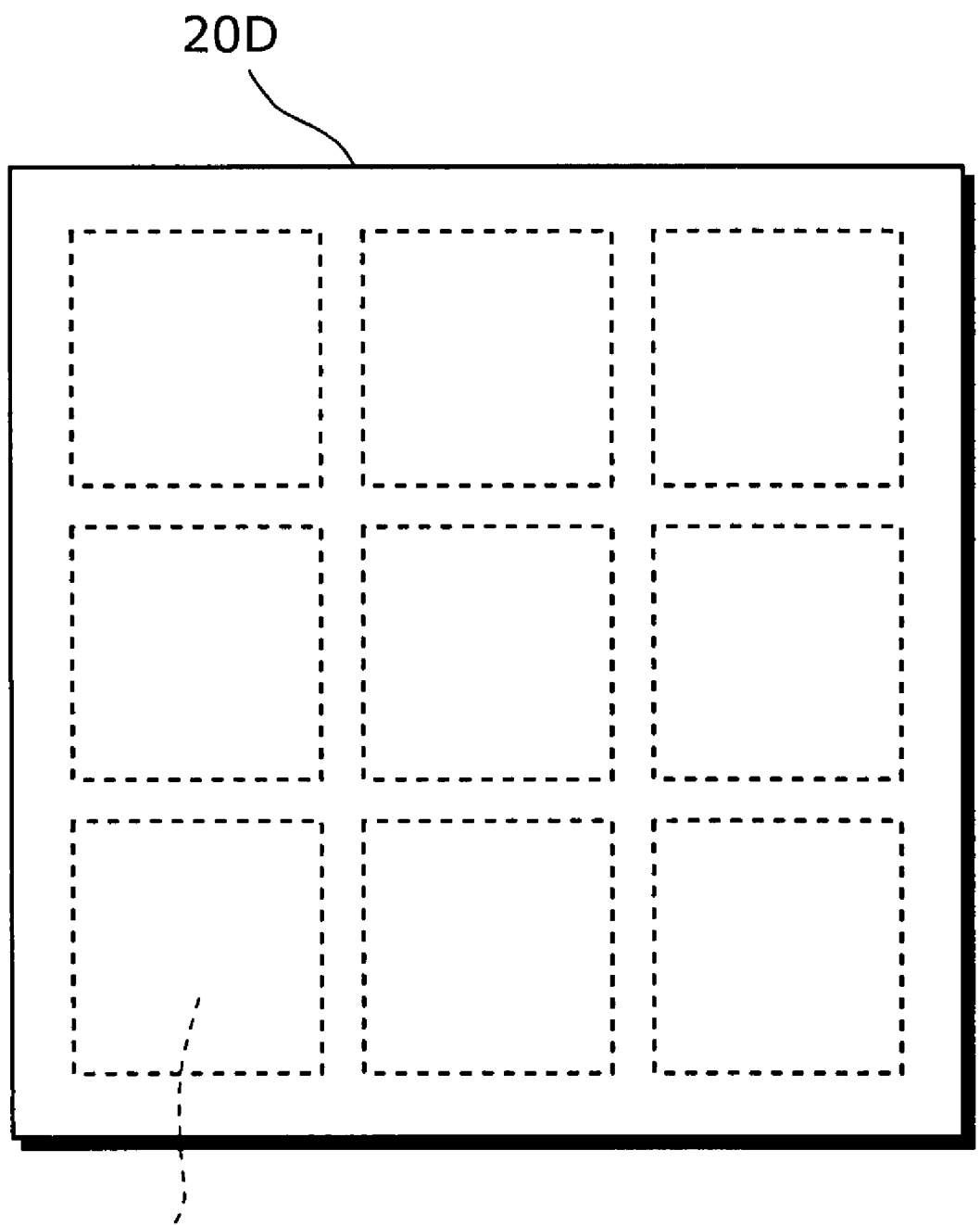
FIG. 23 is a plan view diagram of a vacuum insulation material in the eighth embodiment.
Figure 24:
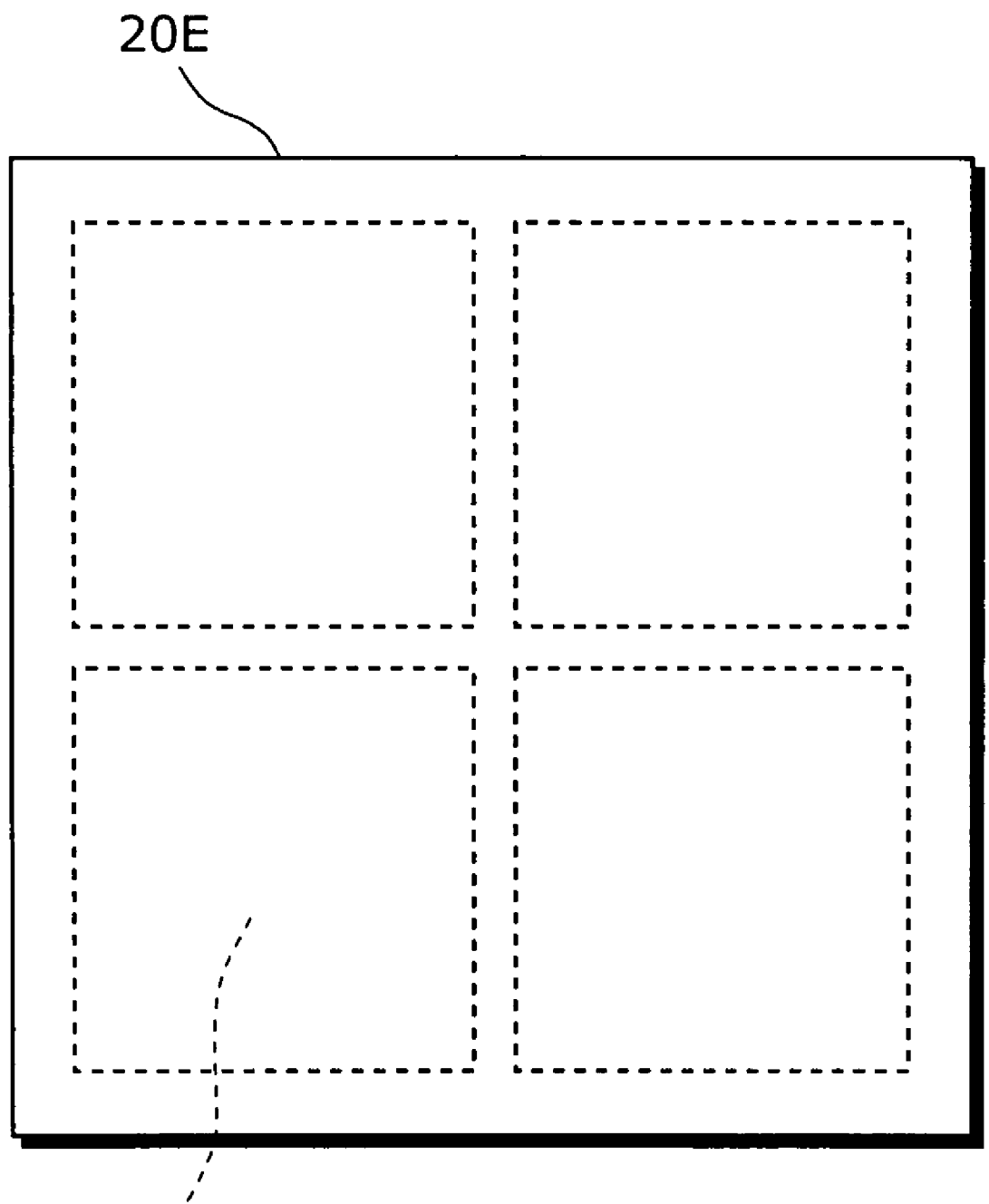
FIG. 24 is a plan view diagram of the vacuum insulation material in the eighth embodiment.
Figure 25:
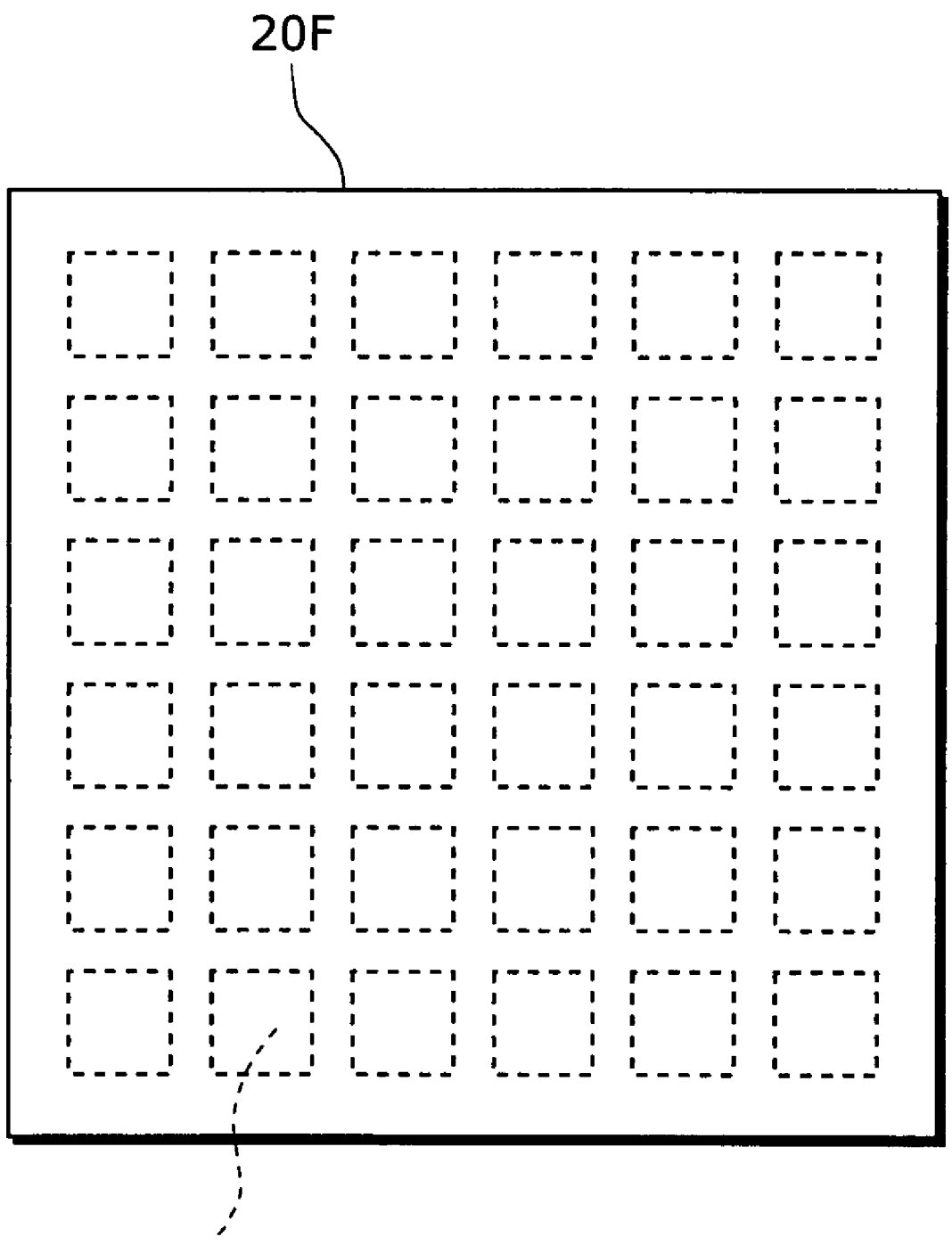
FIG. 25 is a plan view diagram of the vacuum insulation material in the eighth embodiment.

FIG. 22 is a rough cross section diagram of the building 11 in the eighth embodiment, and FIG. 23 through FIG. 25 are plan view diagrams of a vacuum insulation material used for the building 11.

As shown in FIG. 22, the building 11 in the eighth embodiment has the same configuration as those in the embodiments described before, and the construction materials 12D, 12E and 12F indicated in FIG. 10, of which configuration is that the vacuum insulation material 20 consisting of a plural number of the core materials 17 are combined with the structural face material 12a, are installed in an internal part of a wall 31 and of a roof 32 and a bottom part of a floor material 33.

A ratio of an area (an area ratio) for the core material 17 occupying an entire surface of the vacuum insulation material 20 is determined so as to gain a specific degree of heat insulating effect. The area ratio is decided by the size of the core material 17 or the size of the heat adhesion area 21, and the bigger the area ratio of the core material 17 part is, the higher the heat insulating property of the building 11 is.

For example, if the building 11 is located in a cold region, the area ratio of the core material 17 occupying on the entire surface of the vacuum insulation material 20 becomes bigger. Also, depending on a part of the building 11, the area ratio of the core material 17 part of the vacuum insulation material 20 installed may be different.

FIG. 23 shows the vacuum insulation material 20D of the construction material 12D, FIG. 24 shows the vacuum insulation material 20E of the construction material 12E, and FIG. 25 shows the vacuum insulation material 20F of the construction material 12F respectively, and the area ratio of the core material 17 part is respectively 91.2%, 93.8% and 80.2%.

The area ratio of the core material 17 part needs to be decided along with consideration of an impact from breakage of the pouch due to nailing, etc. at the time of construction.

As described above, in the eighth embodiment, a degree of heat insulation for the building 11 is designed along with consideration of the area ratio of the core material 17 for the entire surface of the vacuum insulation material 20. Therefore, according to a climate condition in a region where the building 11 is constructed or an intended purpose of each room within the building, it is possible to optimize the heat insulating effect of the vacuum insulation material 20. As a result of it, it makes it possible to construct the building 11 comfortable for a resident.

Ninth Embodiment

In the third embodiment, the vacuum insulation material 20 described by using FIG. 10 and FIG. 14 is provided by covering a plural number of the core material sections 17 with a piece of the exterior covering material 18 and being vacuum-enclosed.

Figure 26:
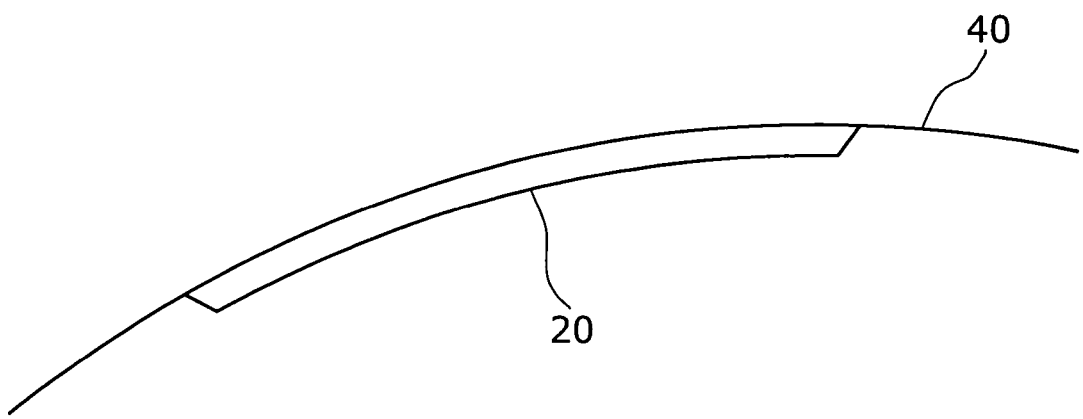
FIG. 26 is a cross section diagram that shows a situation where a vacuum insulation material is attached on a wall having a curving surface in a ninth embodiment.

Therefore, the vacuum insulation material 20 can be bent easily at an area where the core material 17 does not exist, which is the heat adhesion area 21. Therefore, the vacuum insulation material 20, as shown in FIG. 26, can be easily attached and adhered tightly to a wall 40 which has a curving surface like, for example, a ceiling part of a doom type studio. FIG. 26 is a cross section diagram of the vacuum insulation material 20 and the wall 40 in a case in which the vacuum insulation material 20 is attached to the wall 40 having a curving surface. Besides, not only to the wall 40 having the curving surface, but it is also possible to attach and tightly adhere the vacuum insulation material 20 to a part that is not a plane surface.

By the way, if the structural face material 12a is deformable, it is possible to easily attach and tightly adhere the construction material 12 in which the structural face material 12a and the vacuum insulation material 20 are combined into one, to a part of a non-flat surface such as a wall having a curving surface. For example, it is possible to use the construction material 12 in a bath room.

Tenth Embodiment

Figure 27:
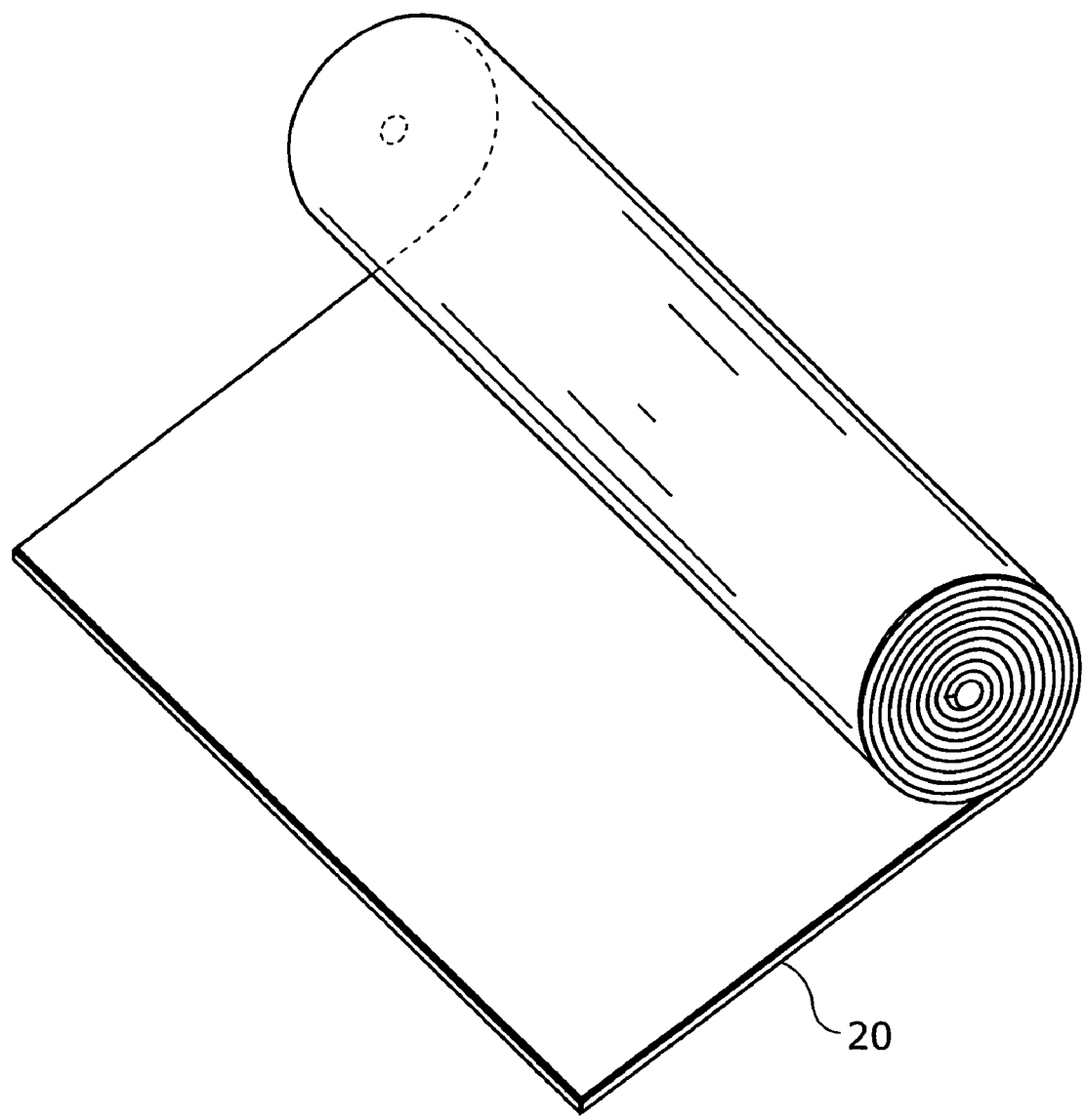
FIG. 27 is a perspective view that shows a vacuum insulation material 20 wound up in a roll form in a tenth embodiment.

The vacuum insulation material 20 may be wound in a roll and may be retained to be cut to designated size, as shown in FIG. 27. By doing so, it is possible to cut down the vacuum insulation material 20 with the least discarded part. Just as described by using FIG. 10, etc., the vacuum insulation material 20 is provided by covering a plural number of the core material sections 17 in the same size, which are located two-dimensionally without overlapping each other, with a piece of the exterior covering material 18 on their top and bottom and having them be vacuum-enclosed. Therefore, even if the vacuum insulation material 20 is cut into a designated size, there is no impact due to breakage of the pouch, which affects a part other than the part being cut. Therefore, it is possible to cut the vacuum insulation material 20 in the tenth embodiment into a various shape and size.

Figure 28:
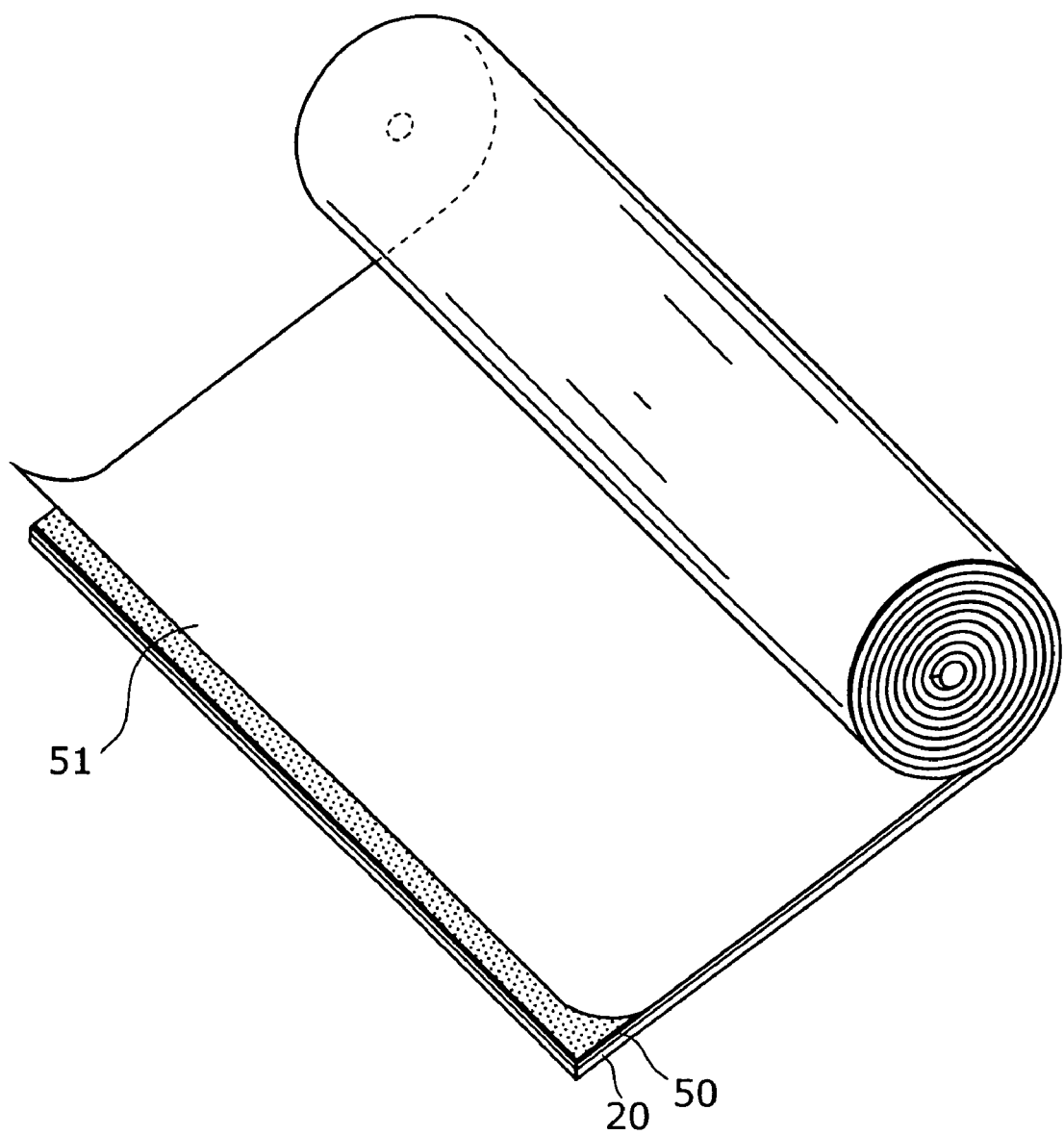
FIG. 28 is a perspective view that shows the vacuum insulation material 20 wound up in a roll form in the tenth embodiment.

By the way, as shown in FIG. 28, the vacuum insulation material 20 has an adherent layer 50 on its upper part of one side, and has a release paper 51 on the top of it, and under that condition it may be rolled up. In this way, just by peeling off the release paper 51, a worker can easily attach the vacuum insulation material 20, which is cut into desired size, to a part he desires. The adherent layer 50 and the release paper 51 may be located on both sides of the vacuum insulation material 20.

Figure 29:
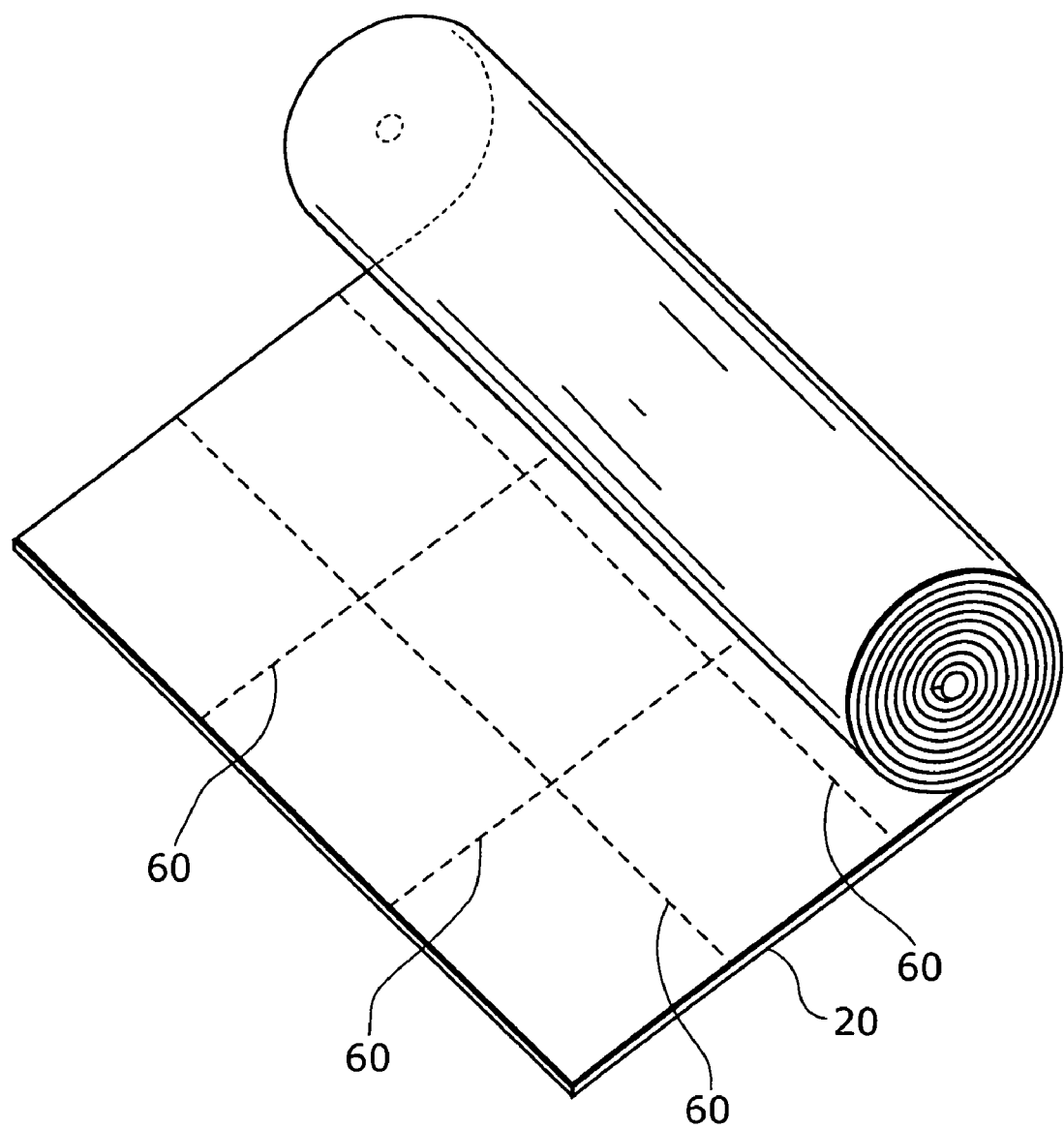
FIG. 29 is a perspective view that shows the vacuum insulation material 20 wound up in a roll form in the tenth embodiment.

Also, as shown in FIG. 29, a mark 60 may be put on the vacuum insulation material 20 at certain intervals such as 30 cm intervals. If the mark 60 is used, it is easy to identify its size so that the worker at a construction site of the building 11 can easily cut down the vacuum insulation material 20 into size he desires, and get it. The mark 60 may also be a perforated line, etc.

The vacuum insulation materials and the construction material 12 described in each of the embodiments is not only available for use of a newly constructed building, but also they can be used for reforming a building.

INDUSTRIAL APPLICABILITY

The construction material in the present invention is used for erecting a new building and constructing a building through reforming work. Also, the building in the present invention is not only useful for a residential building, but also for a commercial building, etc.

The invention claimed is:

1. A building construction comprising:
   a construction material including:
      a plate form structural face material; and
      a plate form vacuum insulation material laminated to said plate form structural face material so as to form an integral plate form construction material having a rear surface of said plate form vacuum insulation material facing a front surface of said plate form structural face material, said plate form vacuum insulation material including:
         a plurality of plate form core material sections;
         two flexible exterior covering materials covering said plate form core material sections, each of said exterior covering materials comprising a laminated film including a heat adhesion layer, a gas barrier layer, and a protection layer laminated in order from a side closest to said plate form core material sections, said exterior covering materials being configured to individually enclose said plate form core material sections within independent vacuum-enclosed spaces such that said plate form core material sections are aligned two-dimensionally without overlapping, each of said plate form core material sections being individually vacuum enclosed within a respective one of said independent vacuum-enclosed spaces, said exterior covering materials being heat-bonded to each other at heat adhesion areas, said heat adhesion areas being all areas of said exterior covering materials not sandwiching said plate form core material sections;
      a wooden base attached to said construction material by a plurality of fasteners driven through said vacuum insulation material, said wooden base and said construction material being arranged such that a front surface of said vacuum insulation material faces said wooden base; and
   an external wall finishing material fixed to said wooden base.

2. The building construction of claim 1, wherein said plate form core material sections have different sizes such that said plate form core material sections include a plate form core material section having a first size and a plate form core material section having a second size smaller than said first size.

3. The building construction of claim 2, wherein said plate form core material section having said second size is located in an area whereat said fasteners are driven through said vacuum insulation material.

4. The building construction of claim 1, wherein each of said fasteners comprises one of a nail and a screw.

5. The building construction of claim 4, wherein said fasteners are driven through said heat adhesion areas of said plate form vacuum insulation material.

6. The building construction of claim 1, wherein said fasteners are driven through said heat adhesion areas of said plate form vacuum insulation material.

* * * * *